United States Patent
Mori

(10) Patent No.: US 7,522,304 B2
(45) Date of Patent: Apr. 21, 2009

(54) IMAGE FORMING SYSTEM

(75) Inventor: Hiromi Mori, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 855 days.

(21) Appl. No.: 11/186,495

(22) Filed: Jul. 21, 2005

(65) Prior Publication Data

US 2006/0017976 A1 Jan. 26, 2006

(30) Foreign Application Priority Data

Jul. 21, 2004 (JP) ............................. 2004-213066

(51) Int. Cl.
*G06K 15/00* (2006.01)
(52) U.S. Cl. ...................... 358/1.18; 358/1.2; 358/1.15; 358/1.13; 715/247; 715/249; 715/251; 715/764
(58) Field of Classification Search ................ 358/1.18, 358/1.15, 1.13, 1.2; 715/247, 249, 251, 764
See application file for complete search history.

(56) References Cited

U.S. PATENT DOCUMENTS

| | | | | |
|---|---|---|---|---|
| 7,099,037 | B2 * | 8/2006 | Clark et al. ................. | 358/1.18 |
| 7,184,165 | B2 * | 2/2007 | Mori et al. ................. | 358/1.18 |
| 7,203,900 | B2 * | 4/2007 | Nara et al. ................. | 358/1.13 |
| 7,281,209 | B2 * | 10/2007 | Nara et al. ................. | 358/1.13 |
| 7,304,764 | B2 * | 12/2007 | Nishikawa et al. .......... | 358/1.18 |
| 7,336,265 | B2 * | 2/2008 | Tamura et al. .............. | 345/173 |
| 7,394,562 | B2 * | 7/2008 | Nakagiri et al. ............ | 358/1.18 |
| 2006/0164685 | A1 * | 7/2006 | Kobayashi ................... | 358/1.18 |

FOREIGN PATENT DOCUMENTS

| | | |
|---|---|---|
| JP | 63-244224 A | 10/1988 |
| JP | 6044245 | 2/1994 |
| JP | 11070717 | 3/1999 |
| JP | 11-175304 A | 7/1999 |
| JP | 2000043362 | 2/2000 |
| JP | 2000066851 | 3/2000 |
| JP | 2002-316453 A | 10/2002 |
| JP | 2002316453 | 10/2002 |
| JP | 2003091521 | 3/2003 |
| JP | 2003162520 | 6/2003 |

OTHER PUBLICATIONS

Patent Abstracts of Japan for JP63-244224 published Oct. 11, 1988.
Patent Abstracts of Japan for JP2002-316453 published Oct. 29, 2002.
Patent Abstracts of Japan for JP11-175304 published Jul. 2, 1999.

* cited by examiner

*Primary Examiner*—Twyler L Haskins
*Assistant Examiner*—Nicholas C Pachol
(74) *Attorney, Agent, or Firm*—Darby & Darby P.C.

(57) ABSTRACT

A personal computer acquires the number of pages L to be laid in one surface of a medium specified by a user, thereby acquiring a page number K to be considered to be a page break for one copy. A counter is incremented every time print data corresponding to one page are transmitted to a printer. When the value of the counter has exceeded the page-break page number K, recording of a top page of the next copy on the same recording paper is prevented by inserting a blank page, so long as the counter does not assume a multiple of the page number L.

8 Claims, 14 Drawing Sheets

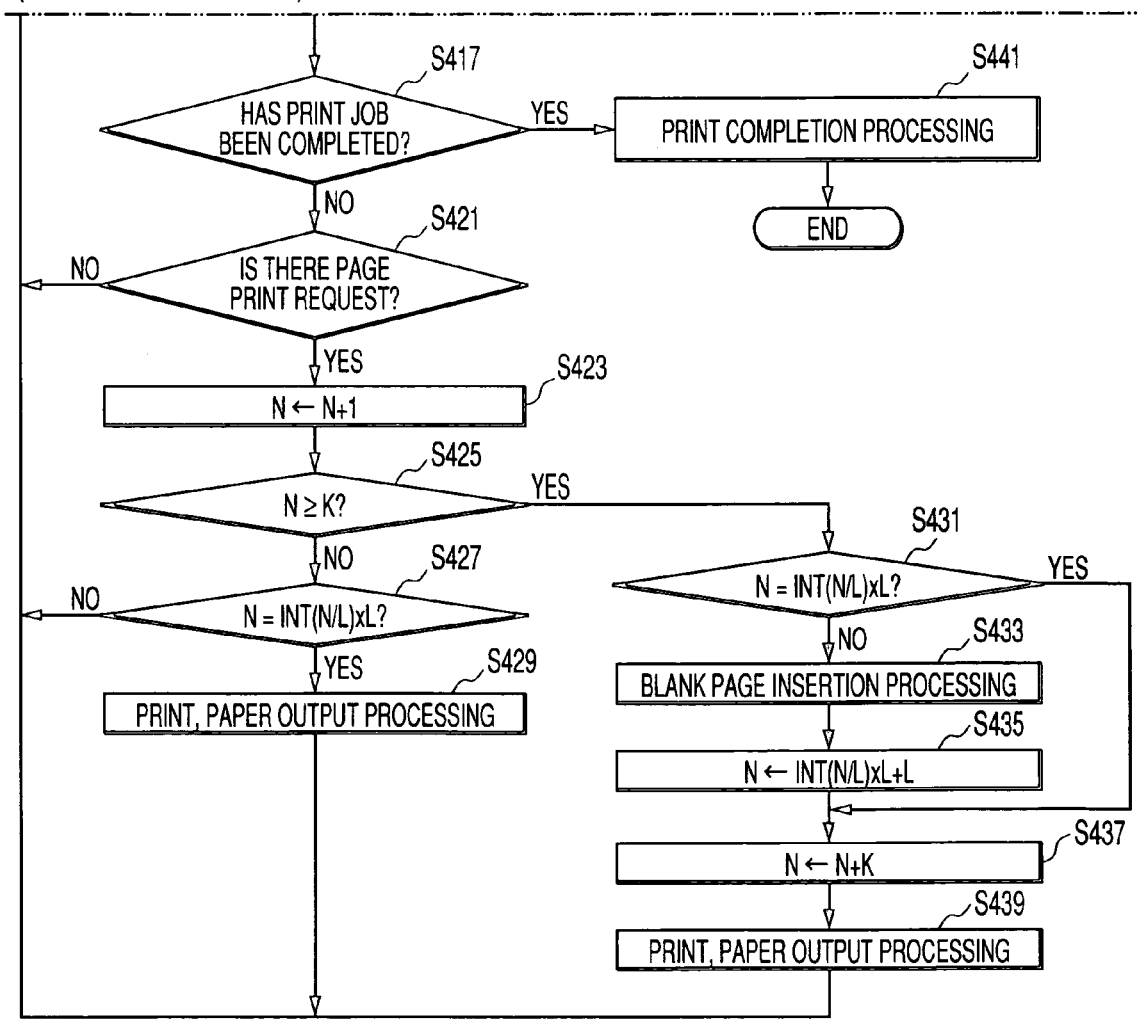

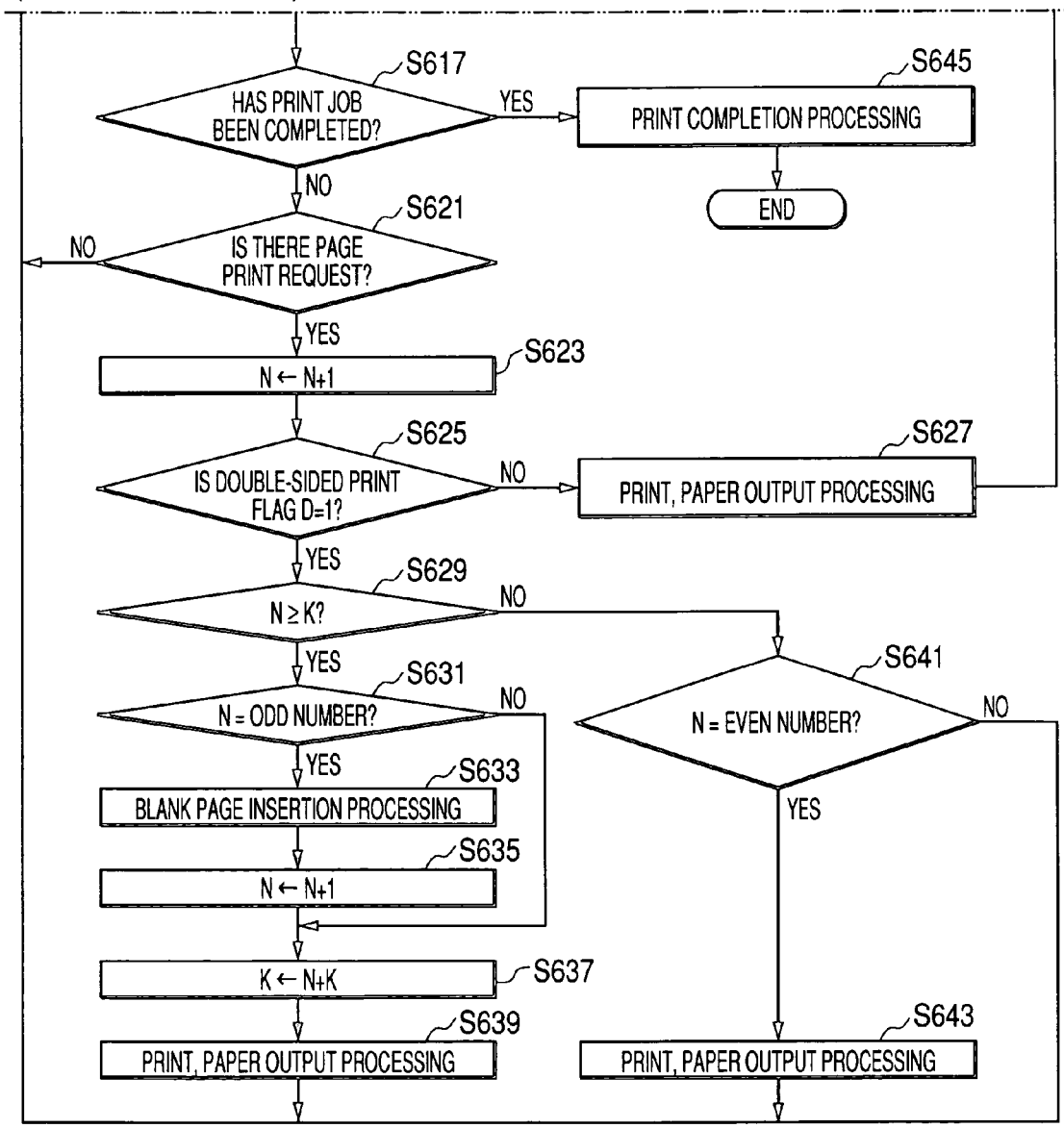

IMAGE FORMING SYSTEM

INCORPORATION BY REFERENCE

The present application claims priority under 35 U.S.C. §119 to Japanese Patent Application No. 2004-213066 filed on Jul. 21, 2004. The content of the application is incorporated herein by reference in its entirety.

BACKGROUND OF THE INVENTION

1. Field of the Invention

The present invention relates to an image forming system.

2. Description of the Related Art

Conventionally, a printer, a copier, or a like machine performs page-layout printing operation, wherein images of L pages (where L is an integer satisfying a relationship of $L \geq 2$) are scaled down to be laid out within one page of recording paper.

During such a page-layout printing operation, recording paper is switched to the next sheet of recording paper every time images of L pages are recorded on the recording paper. However, depending on contents for printing, there may arise a case where recording paper is desired to be switched at a page which does not correspond to a page break that arises every L pages.

In response to such a demand, for example, JP-A-2002-316453 discloses a technique which enables "designation of a page-break position" when page-layout printing is performed. According to this technique, in cases where images of four pages are scaled down to be laid out in one sheet of recording paper, if "3" is designated as a page-break position, printing of images for one sheet of recording paper and ejection of paper (i.e., switching of paper to the next sheet of paper) are performed after images of three pages have been scaled down to be laid out in one page of recording paper. The fourth page is laid out on the next sheet of recording paper.

SUMMARY OF THE INVENTION

Although the technique disclosed in JP-A-2002-316453 enables a user to arbitrarily designate a location where recording paper is to be switched to the next sheet of recording paper, the user is required to designate, one by one, all of locations where paper is to be switched, through use of page numbers. In a situation where printed matter including a predetermined number of pages per copy is desired to be printed in a number of copies by utilization of a page-layout printing function, when an attempt is made to designate a page number where page break is to be effected through the above-described "designation of a page-break position," numerals equivalent to the number of copies must be input while being separated from each other by commas. Therefore, there arises a problem of the user being forced to perform an extremely troublesome input operation.

By way of a specific example, in a case where images of, e.g., four pages, are scaled down to be laid out into one page of recording paper, printed matter including three pages per copy is assumed to be printed in 100 copies. When an attempt is made to designate a page break for one copy through the above-described "designation of a page-break position," (100) numerals equivalent in number to the (100) copies must be input while being separated from each other by commas, such as "3, 6, 9, 12, 15, . . . , 294, 297, and 300." Consequently, the user must perform considerably troublesome operation.

Such a problem is not limited solely to a case where page-layout printing is performed, but can also arise similarly in a case where double-sided printing is performed.

For instance, in a case where images of two pages are printed on both sides of recording paper, when printed matter including three pages per copy is printed in 100 copies, recording paper is desired to be switched every time a third page is printed, thereby preventing printing of a first page of the next copy on the back of the third page of the current copy. However, according to a designation method analogous to the above-described "designation of a page-break position," (100) numerals equivalent to the number of copies (100) must again be input while being separated from each other by commas.

The present invention provides an image forming system capable of more easily performing printing operation such that recording paper is switched to the next sheet of recording paper at every page break when a plurality of copies of printed matter, each copy including a predetermined number of pages, are produced by means of a page-layout printing function or a double-sided printing function.

According to an aspect of the invention, there is provided an image forming system including: a print data generation section that generates print data; an image forming section that forms an image on a medium; and a control device that controls the image forming section so as to effect page-layout printing that includes scaling-down of images corresponding to L pages (where L is an integer satisfying a relationship $L \geq 2$) on the basis of the print data generated by the print data generation section and printing conditions designated by a user, and laying-out of the scaled-down images within one surface of the medium, the control device including: a print data input unit for inputting the print data by way of the print data generation section; a layout page number acquisition unit that acquires the number of pages L designated by the user as one of the printing conditions; a page-break page number acquisition unit that acquires, as one of the printing conditions, a page number K (K is an integer satisfying a relationship $K \geq 1$) which is to be considered to be a page break for one copy designated by the user; a determination unit which takes, as copy unit data, page numbers determined by separating the print data input by the print data input unit from a top page side of the print data by every K pages; takes, as surface unit data, page numbers determined by separating the copy unit data from a top page side of the copy unit data by every number of images to be formed on one surface of the medium; takes, as determination object data, the surface unit data including a final page of the copy unit data; and determines whether or not the number of pages "p" included in the determination object data coincides with the number of pages L; and a round processing control unit that controls the image forming section such that blank pages compensating for images corresponding to (L-p) pages are formed in addition to the images corresponding to "p" pages formed on the basis of the determination object data when the determination unit determines that there exists a relationship (p<L).

In this image forming system, the print data generation section, which may be provided in a host device, is a section for generating print data which become a base. For instance, when the host device is executing operation pursuant to an application program having a print data generation function, such as word processing software, the section relevant to generation of print data corresponds to the print data generation section. The image forming section provided in an image forming device corresponds to the hardware for forming an image on a medium.

This image forming system may be equipped with the host device and the image forming device, such as those mentioned above. Means constituting such a system are interposed between the above-described print data generation section and the image forming section. On the basis of the print data generated by the print data generation section and the printing condition designated by the user, the image forming section is controlled so as to perform page-layout printing for scaling down images corresponding to L pages (where L is an integer satisfying a relationship $L \geq 2$) and laying out the thus-scaled-down images on one surface of the medium.

More specifically, in this image forming system, the print data input unit inputs the print data by way of the print data generation section.

The layout page number acquisition unit acquires the number of pages L designated by the user as one of the printing conditions.

The page-break page number acquisition unit acquires, as one of the printing conditions, the page number K (K is an integer satisfying a relationship $K \geq 1$) which is to be considered to be a page break for one copy designated by the user. A value specified directly by the user may be acquired as the page number K, or a value specified indirectly by the user may be acquired. By way of a specific example, when the page number K is directly specified, the essential requirement is to acquire the page number K. When the user is expected to designate the number of copies K1 and the total page number K2 accounting for all copies, the essential requirement is to acquire the page number K=K2/K1, which is computed from K1 and K2.

After the print data and the printing conditions (the number of pages L and the page number K) have been acquired in the manner mentioned above, the determination unit takes, as copy unit data, page numbers determined by separating print data input by the print data input unit from a top page thereof by every number of images to be formed on K pages; takes, as surface unit data, page numbers determined by separating the copy unit data from the top page thereof by every number of images to be formed on one surface of the medium; takes, as determination object data, the surface unit data including a final page of the copy unit data; and determines whether or not the number of pages "p" included in the determination object data coincides with the number of pages L.

When the determination unit determines that there exists a relationship such that the number of pages "p"<the number of pages L, the round processing control unit controls the image forming section such that blank pages compensating for images corresponding to (L-p) pages are formed in addition to the images corresponding to "p" pages formed on the basis of the determination object data. Specific control for enabling formation of blank pages can change in accordance with the mechanism of the image forming section. If blank pages which compensate for (L-p) pages can be formed consequently by simply issuing a command for outputting a medium, control for issuing such a command for outputting a medium may be desirable, or control for outputting data representing blank pages which compensate for (L-p) pages may also be desirable.

As a consequence of such a control operation, if rounding is required every time images to be formed on K pages, which are to be considered to be a page break for one copy, blank pages compensating for (L-p) pages are formed. A page break for copy unit, including this blank page, coincides with the page break for the unit surface of a medium.

Consequently, according to this image forming system, during performance of page-layout printing, by means of which images corresponding to L pages are scaled down to be laid out on one surface of a medium, the medium can be switched at a page break for each copy by means of designating only the page number K (or a parameter which enables computation of the page number K) per copy without consecutively designating a page number which becomes a page break for each copy.

If this image forming system is configured as a system whose units are interposed between the print data generation section and the image forming section, all of the units constituting the image forming system may be provided on the host device or the image forming device. Moreover, when a third device is interposed between the host device and the image forming device, all of the units constituting the image forming system may be provided on the third device. Further, if the respective units constituting the image forming system are provided on the data transmission path extending from the print data generation section to the image forming section and are arranged in such a sequence that processing of a preceding stage, which is required in a subsequent stage, has been completed before processing of the subsequent stage, the respective unit may be arranged on a plurality of devices in a distributed manner. For instance, some of the units may be provided on the host device, and some of the remaining units may be provided on the image forming device. Moreover, when the third device is provided as mentioned previously, some of the units may be provided on the host device, and some of the remaining units may be provided on the third device. Alternatively, some of the units may be provided on the third device, and some of the remaining units may be provided on the image forming device. In addition, the respective units may be provided on the host device, the third device, and the image forming device in a distributed manner.

According to another aspect of the invention, there is provided an image forming system including: a print data generation section that generates print data; an image forming section that forms an image on a medium; and a control device that controls the image forming section so as to effect double-sided printing, which uses first and second surfaces of the medium, on the basis of the print data generated by the print data generation section and printing conditions designated by a user, the control device including: a print data input unit for inputting the print data by way of the print data generation section; a page-break page number acquisition unit that acquires, as one of the printing conditions, a page number K (K is an integer satisfying a relationship $K \geq 1$) which is to be considered to be a page break for one copy designated by the user; a determination unit which takes, as copy unit data, page numbers determined by separating the print data input by the print data input unit from a top page side of the print data by every K pages; takes, as medium unit data, page numbers determined by separating the copy unit data from a top page side of the copy unit data by every number of images to be formed on two surfaces of the medium; takes, as determination object data, the medium unit data including a final page of the copy unit data; and determines whether an image of the final page included in the determination object data is formed on the first or second surface; and a round processing control unit that controls the image forming section such that a blank page compensating for an image to be formed on the second surface is formed in addition to the image to be formed on the first surface formed on the basis of the determination object data, when the determination unit determines that the image of the final page included in the determination object data is formed on the first surface.

In this image forming system, the print data generation section, which may be provided in a host device, is a section for generating print data which become a base. For instance, when the host device is executing operation pursuant to an application program having a print data generation function, such as word processing software, the section relevant to generation of print data corresponds to the print data generation section. The image forming section provided in an image forming device corresponds to the hardware for forming an image on a medium and has a structure which enables at least double-sided printing.

This image forming system may be equipped with the host device and the image forming device, such as those mentioned above. Means constituting such a system are interposed between the above-described print data generation section and the image forming section. On the basis of the print data generated by the print data generation section and the printing condition designated by the user, the image forming section is controlled so as to perform double-sided printing that uses first and second surfaces of the medium.

More specifically, in this image forming system, the print data input unit inputs print data by way of the print data generation section.

The page-break page number acquisition unit acquires, as one of the printing conditions, the page number K (K is an integer satisfying a relationship $K \geq 1$) which is to be considered to be a page break for one copy designated by the user. A value specified directly by the user may be acquired as the page number K, or a value computed from the value specified indirectly by the user may be acquired. By way of a specific example, when the page number K is directly specified, the essential requirement is to acquire the page number K. When the user is expected to designate the number of copies K1 and the total page number K2 accounting for all copies, the essential requirement is to acquire the page number K=K2/K1, which is computed from K1 and K2.

After the print data and the printing conditions (the page number K) have been acquired in the manner mentioned above, the determination unit takes, as copy unit data, page numbers determined by separating print data input by the print data input unit from a top page thereof by every number of images to be formed on K pages; takes, as medium unit data, page numbers determined by separating the copy unit data from the top page thereof by every number of images to be formed on two surfaces of the medium; takes, as determination object data, the medium unit data including a final page of the copy unit data; and determines whether an image of the final page included in the determination object data is formed on the first surface or the second surface.

When the determination unit determines that the image of the final page included in the determination object data is formed on the first surface, the rounding unit controls the image forming section such that a blank page which compensates for a second surface is formed in addition to the image for the first surface formed on the basis of the determination object data. Specific control for enabling formation of blank pages can change according to the mechanism of the image forming section. If a blank pages which compensates for the second surface can be formed consequently by simply issuing a command for outputting a medium, control for issuing such a command for outputting a medium may be desirable, or control for outputting data representing a blank page which compensates for the second surface may also be desirable.

As a consequence of such a control operation, if rounding is required every time the number of images to be formed on K pages, which is to be considered to be a page break for one copy, are formed, a blank page compensating for the second surface is formed. A page break for copy unit, including this blank page, coincides with the page break for two surfaces of the unit surface of a medium.

Consequently, according to this image forming system, when double-sided printing using the first and second surfaces of a medium is carried out, the medium can be switched at a page break for one copy by means of designating only the page number K (or a parameter which enables computation of the page number K) per copy without consecutively designating a page number which becomes a page break for each copy.

If this image forming system is configured as a system whose units are interposed between the print data generation section and the image forming section, the respective units constituting the image forming system may be provided on the host device or the image forming device. Moreover, when a third device is interposed between the host device and the image forming device, all of the units constituting the image forming system may be provided on the third device. Further, if the respective units constituting the image forming system are provided on the data transmission path extending from the print data generation section to the image forming section and are arranged in such a sequence that processing of a preceding stage, which is required in a subsequent stage, has been completed before processing of the subsequent stage, the respective units may be arranged on a plurality of devices in a distributed manner. For instance, some of the units may be provided on the host device, and some of the remaining units may be provided on the image forming device. When the third device is provided as mentioned previously, some of the units may be provided on the host device, and some of the remaining units may be provided on the third device. Alternatively, some of the units may be provided on the third device, and some of the remaining units may be provided on the image forming device. In addition, the respective units may be provided on the host device, the third device, and the image forming device in a distributed manner.

BRIEF DESCRIPTION OF THE DRAWINGS

The present invention may be more readily described with reference to the accompanying drawings.

DETAILED DESCRIPTION OF THE PREFERRED EMBODIMENTS

Embodiments of the present invention will be described hereinbelow by citing some specific examples.

First Embodiment

Figure 1:
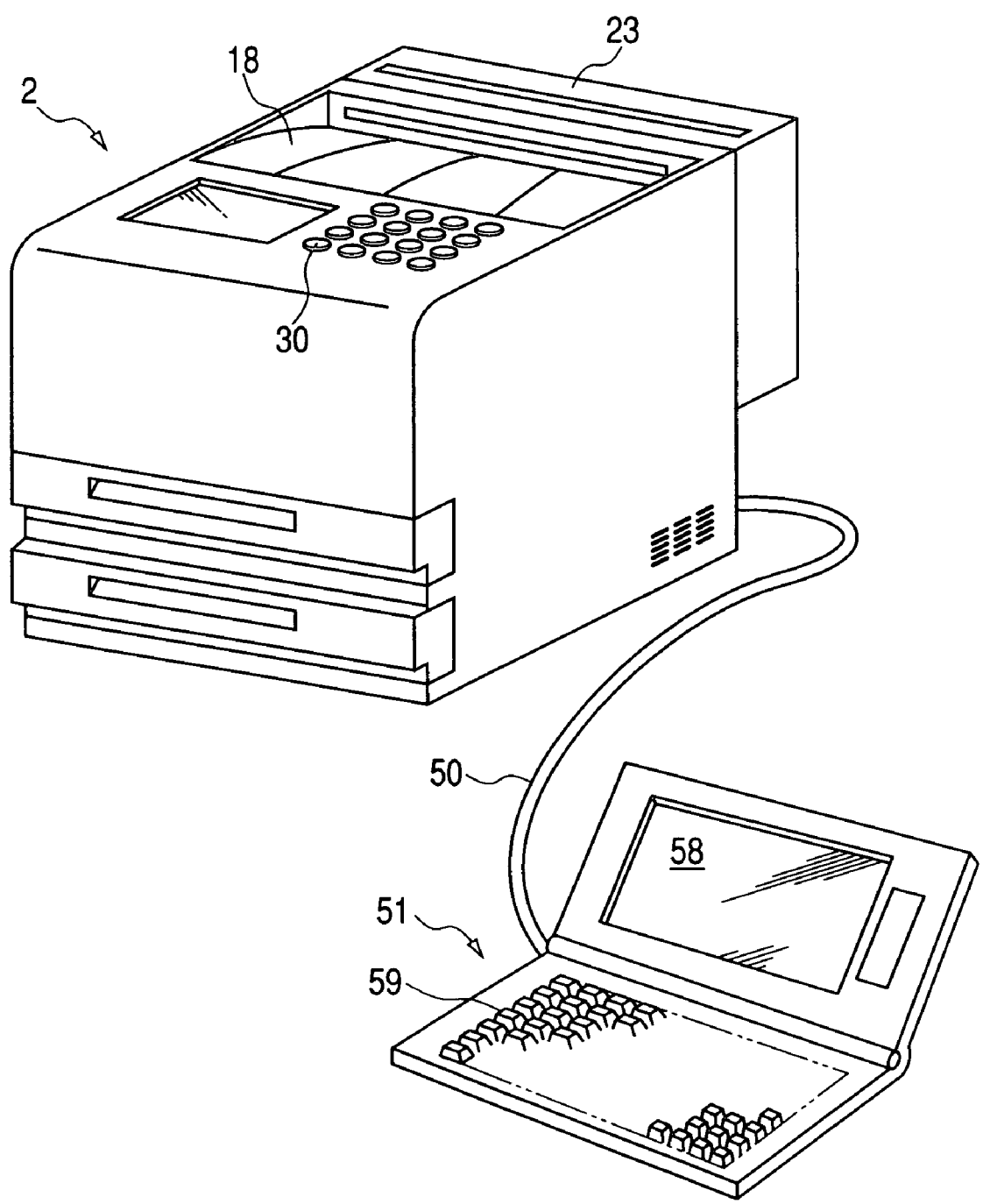
FIG. 1 is a schematic block diagram showing an image forming system according to an embodiment of the present invention.

First, hardware constituting an image forming system will be described. FIG. 1 is a perspective view showing hardware constituting an image forming system.

The image forming system has a laser printer (hereinafter simply called a "printer") 2 capable effecting double-sided printing, and a personal computer 51 connected to the printer 2 by way of a communications line 50.

Figure 2:
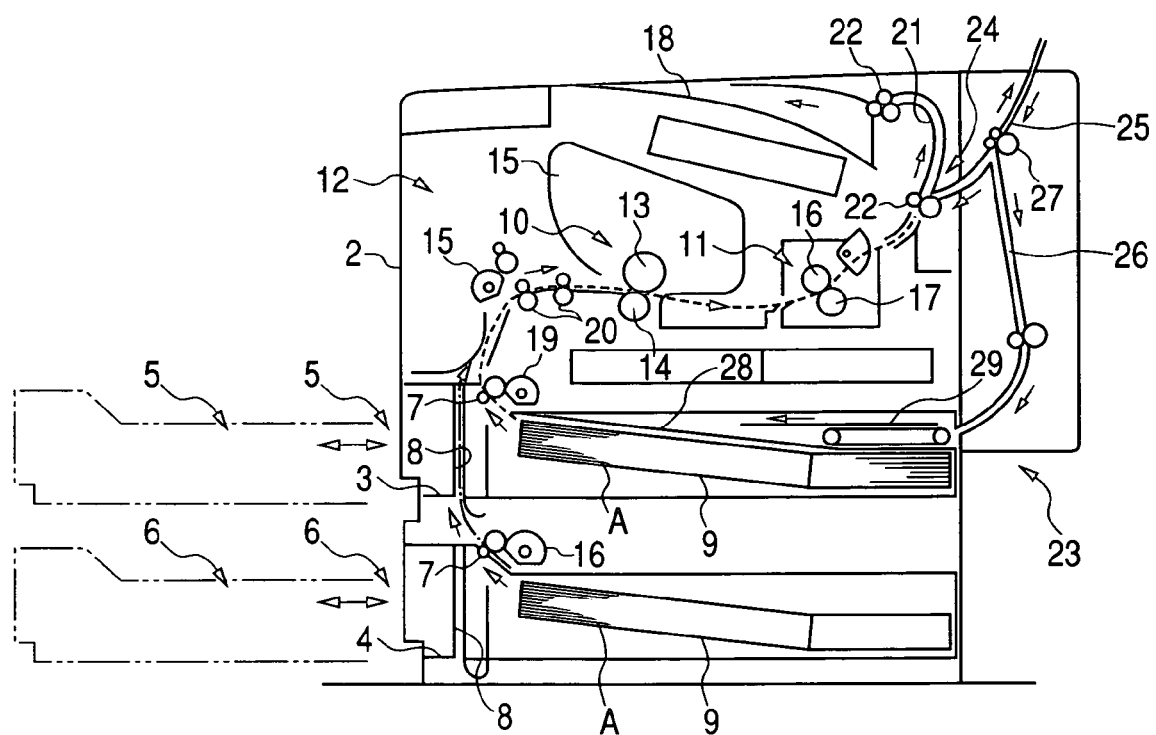
FIG. 2 is an internal structural view of a printer.

The structure of the printer 2 will now be described. FIG. 2 is a cross-sectional view of the printer 2.

A first cassette housing section 3 and a second cassette housing section 4, each of which has an open front, are formed one on top of the other within a lower internal portion of the printer 2. A first paper feeding cassette 5 is removably attached to the first cassette housing section 3, and a second paper feeding cassette 6 is removably attached to the second cassette housing section 4. The paper feeding cassettes 5, 6 are formed into the same shape, and a paper feed roller 7 and a vertically-elongated paper-feed slot 8 are provided at the front end of each paper feed cassette so as to extend in a direction perpendicular to the sheet of FIG. 2. A support plate 9 for elastically supporting a plurality of sheets of paper A is provided in each of the paper feed cassettes 5, 6.

A print section 12 having an image forming unit 10, a fixing section 11, and the like, is provided at a position above the first cassette housing section 3. The image forming unit 10 has a transfer roller 14 which is brought into pressed contact with, so as to form a pair with, a photosensitive drum 13 provided within a toner cartridge 15; and a laser emitter (omitted from the drawings) for emitting a laser beam in accordance with communications data. The fixing section 11 is formed from a heating roller 16 and a press roller 17, which form a pair, at a rear position on a transport path of the image forming unit 10. The transport path is formed within the printer 2 by way of such an image forming unit 10 and the fixing section 11, and a transport unit for transporting the paper A to an output section 18 located at an upper surface of the printer 2 is formed in the transport path.

A pickup roller 19 used for feeding the paper A is disposed so as to be situated at the leading-end portion of the paper A loaded within the first paper feed cassette 5. The pickup roller 19 assumes a half-moon-shaped cross-sectional profile such that the pickup roller 19 is brought into pressed contact with the paper A over only a predetermined angle. The paper feed roller 7 is disposed closely to the pickup roller 19. A plurality of feed rollers 20 are disposed at the rear of the transport path, and the transport path is formed at the rear of the feed rollers 20 from the pair consisting of the photosensitive drum 13 and the transfer roller 14 and the pair consisting of the heating roller 16 and the press roller 17. Moreover, an output transport path 21 used for outputting the paper A to the output section 18 is formed at the rear position of the transport path, and a pair of feed rollers 22 are disposed respectively at the entrance and exit of the output transport path 21.

The output section 18 is formed on the upper surface of the printer main body 2, and a control panel 30, by way of which setting of the number of prints, or the like, is performed, is also provided on the upper surface. An inversion unit 23 which inverts the transport direction of the paper A having passed through the print section 12 is disposed on the back (a right-side in the drawing) of the printer main body 2. A branch section 24 is formed in the output transport path 21 within the printer main body 2, and the transport path is extended such that the paper A is transported toward the inversion unit 23. The branch section 24 is provided with an unillustrated rotary guide which is rotationally operated by an electromagnetic solenoid, or the like, thereby switching the transport direction of the paper A.

The inversion unit 23 is formed from a first inversion transport path 25 and a second inversion transport path 26. The first inversion transport path 25 is formed such that the lower end of the same is in mutual communication with the branch section 24 attached to the output transport path 21 of the printer main body 2, and such that the upper end of the same is opened by way of the upper surface of the inversion unit 23. In contrast, the second inversion transport path 26 is extended to the lower first cassette housing section 3 by way of a branch provided at any point along the first inversion transport path 25. A pair of changeover rollers 27, which can rotate forwardly and rearwardly, are provided at a branch between the inversion transport paths 25, 26.

The printer 2 configured as mentioned above operates as follows.

When the pickup roller 19 is rotated, the paper A housed in the first paper feed cassette 5 is brought into pressed contact with the tip end of the paper A by minute force. Therefore, only the top sheet that is liable to frictional resistance is fed forward concurrently with rotation of the pickup roller 19. The forwardly-fed paper A is sent to the transport path in the printer main body 2 by way of the paper feed roller 7. The paper A transported over the transport path by the feed roller 20 is arranged in the print section 12.

The first surface of the paper A is printed by the image forming unit 10. Contents of the communications data transmitted from the personal computer 51 are converted into print data to be printed by a character generation circuit 37, and the thus-converted data are stored in RAM 40. By means of a laser beam emitted on the basis of the print data stored in the RAM 40, an electrostatic latent image bearing positive electric charges is generated on the first surface of the photosensitive drum 13. The toner bearing negative electric charges adheres to the electrostatic latent image, and the toner is transferred onto the paper A by the transfer roller 14. The toner is heated and fixed by the heating roller 16 and the press roller 17.

In a single-sided printing mode, an unillustrated rotary guide is operated by the branch section 24. The paper A having exited the fixing section 11 is output to the output section 18 by way of the output transport path 21. In the meantime, in the double-sided printing mode, the paper A is transported from the branch section 24 to the inversion unit 23.

The paper A transported to the inversion unit 23 is temporarily transported upward along the first inversion transport path 25 by positively rotating the pair of changeover rollers 27. After having ascended to a predetermined position, the paper A is transported downward within the second inversion transport path 26 when the pair of changeover rollers 27 are reversely rotated by a drive motor. The paper A that has been inverted and passed through the second inversion transport path 26 is delivered to the transport unit 28.

The paper A whose traveling direction has been inverted by the inversion unit 23 passes through the transport unit 28 while being turned upside down. Specifically, in relation to the paper A loaded in or transported to the first paper feed cassette 5, a lower surface of the paper achieved in that position is subjected to printing. A second surface of the inverted paper A becomes a lower surface at the position of the transport unit 28. The paper A transported to the transport unit 28 is fed forward by the transport belt 29, and is again transported to the transport path within the printer main body 2 by way of the paper feed roller 7. After the second surface of the paper has been printed, the paper is output to the output section 18.

Figure 3:
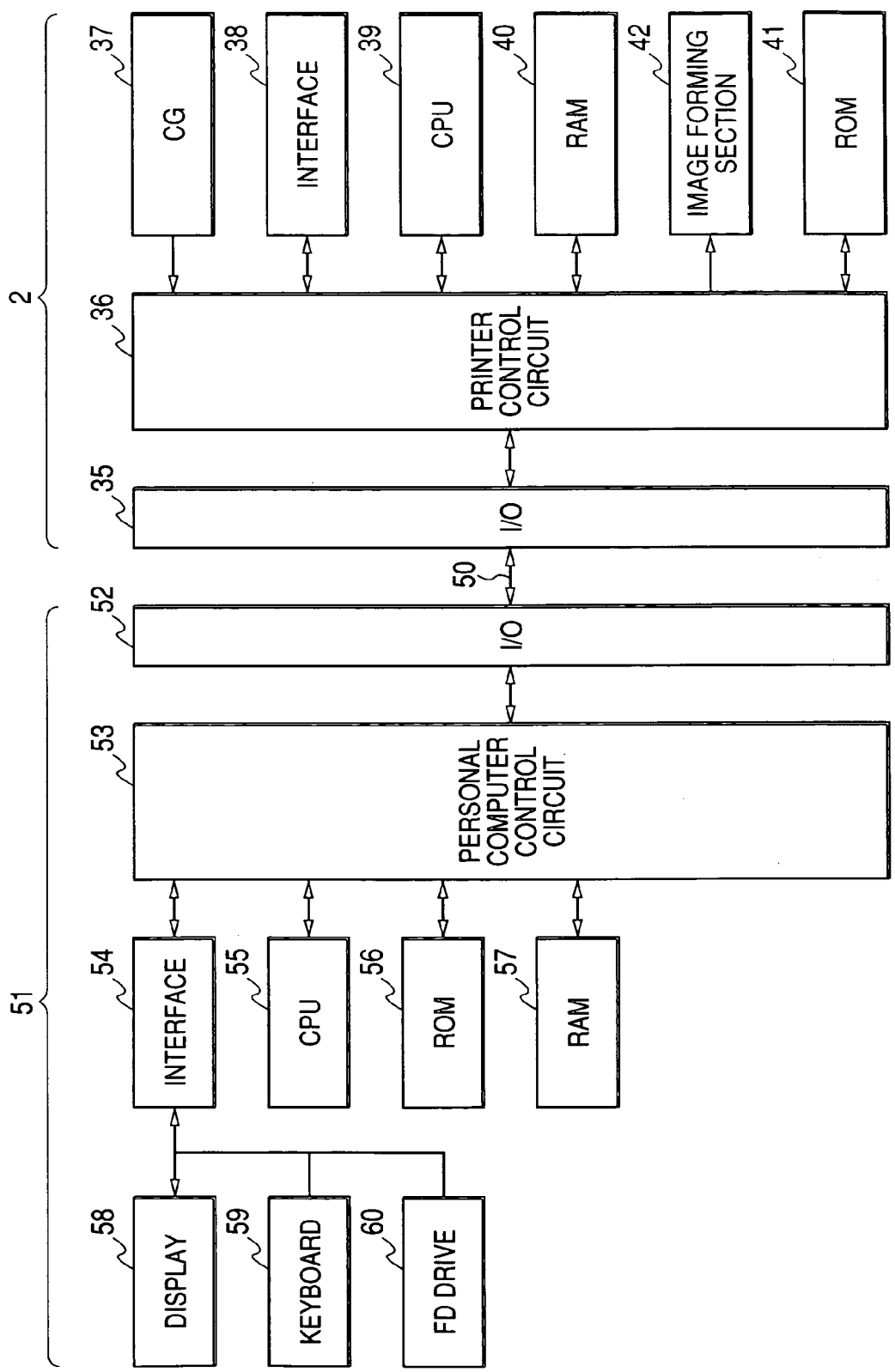
FIG. 3 is a hardware block diagram pertaining to a personal computer and the printer.

The hardware configuration of the printer 2 and that of the personal computer 51 will now be described. FIG. 3 is a block diagram showing a control system for the printer 2 and the personal computer 51.

The printer 2 has an input/output (I/O) circuit 35 which transmits or receives communications data to or from the personal computer 51 by way of the communications line 50. A printer control circuit 36 is connected to this input/output (I/O) circuit 35. The printer control circuit 36 is connected to the character generation (CG) circuit 37, an interface 38, a CPU 39, the RAM 40, a ROM 41, and an image forming section 42.

The personal computer 51 has an input/output (I/O) circuit 52 which transmits or receives communications data to or from the printer 2 by way of the communications line 50. A personal computer control circuit 53 which controls the entirety of the personal computer 51 is connected to this input/output (I/O) circuit 52. The personal computer control circuit 53 is connected to an interface 54, a CPU 55, ROM 56, and RAM 57. The interface 54 is connected to a display 58, a keyboard 59, and an FD (Flexible Disk) drive 60.

The software configuration of the personal computer 51 will now be described.

Windows (registered trademark) is installed as an OS (Operating System) in the personal computer 51. The OS offers basic functions commonly used by applications, such as an input/output function; e.g., an input performed by way of the keyboard 59 and an output display on the display 58, management of a disk or memory, or the like. Since various functions offered by Windows (registered trademark) are known, their detailed explanations are omitted. However, the following descriptions are continued on the assumption that the personal computer 51 has the various functions offered by Windows (registered trademark).

Figure 4:
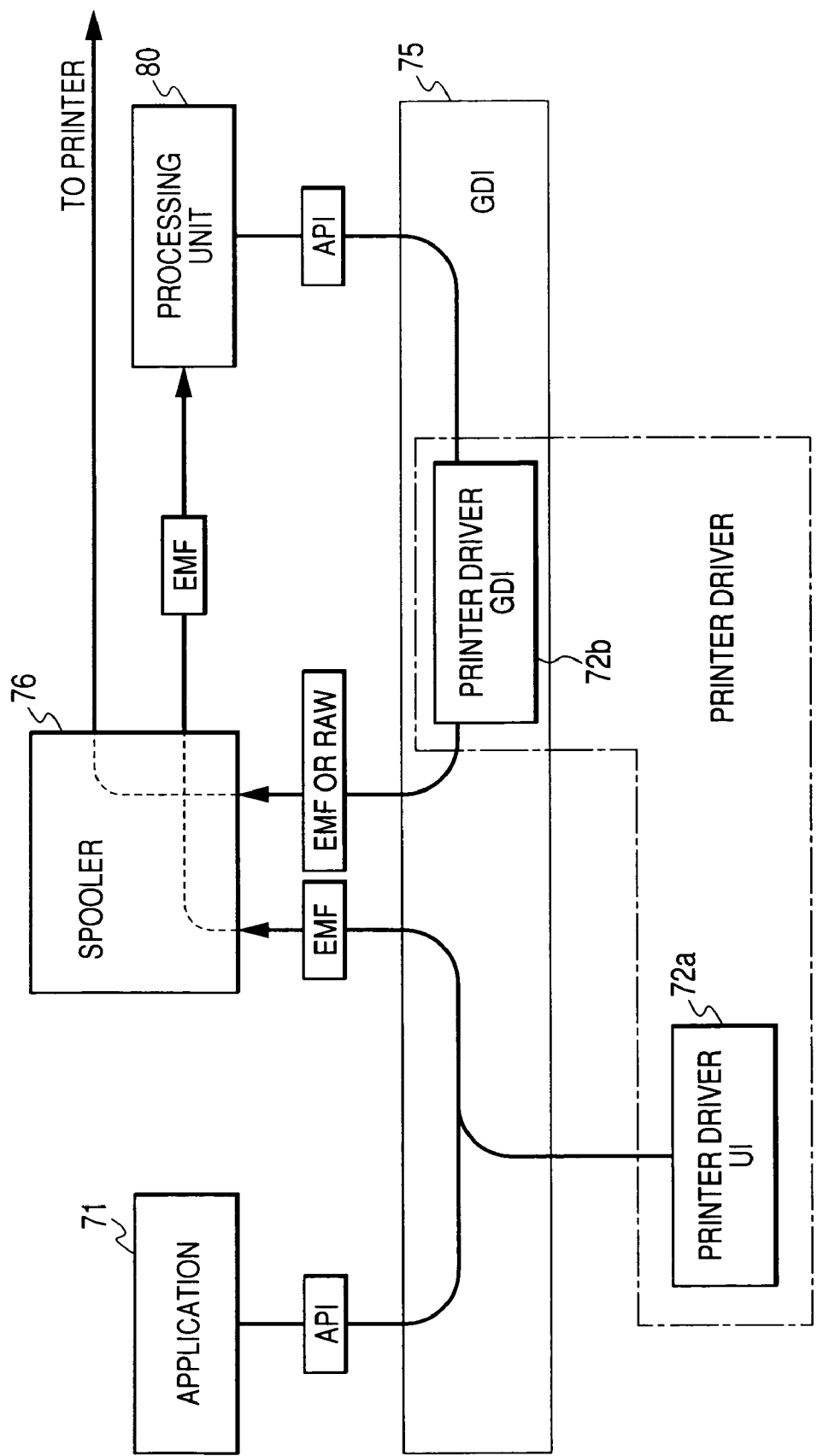
FIG. 4 is a print-system software block diagram of the personal computer.

FIG. 4 is a view showing flow of print data exchanged by print-system software of the personal computer 51.

The OS installed in the personal computer 51 has a multitasking function. By means of this multitasking function, the personal computer 51 executes, in parallel and in a time sharing manner, a plurality of processing operations in units of task. Processing to be executed by an application 71, processing to be executed by a printer driver 72, processing to be executed by a GDI 75, processing to be executed by a spooler 76, and processing to be executed by processing unit 80 are executed in parallel as processing operations relevant to the present image forming system. Functions of the present image forming system are realized by cooperation of these processing operations.

To be more specific, the application 71 in the personal computer 51 is software which runs on the OS; e.g., word processing software or spreadsheet software. When the user using this application 71 performs, on the personal computer 51, an operation for commanding printing operation, the application 71 generates a rendering command corresponding to an image to be printed, and delivers the rendering command to the GDI (Graphics Device Interface) 75.

The printer driver 72 is a module which offers special printing functions, such as page-layout printing for scaling-down images of L pages (where L is an integer satisfying L≧2) and laying out the images in one sheet of recording paper (equivalent to a medium) or double-sided printing using first and second pages of recording paper. When the user issues a command for effecting special printing during the course of performing operation for issuing a print command, by means of a function (user interface) offered by a printer driver UI 72a, the printer driver 72 generates a rendering command corresponding to the special printing and delivers the rendering command to the GDI 75.

Figure 5:
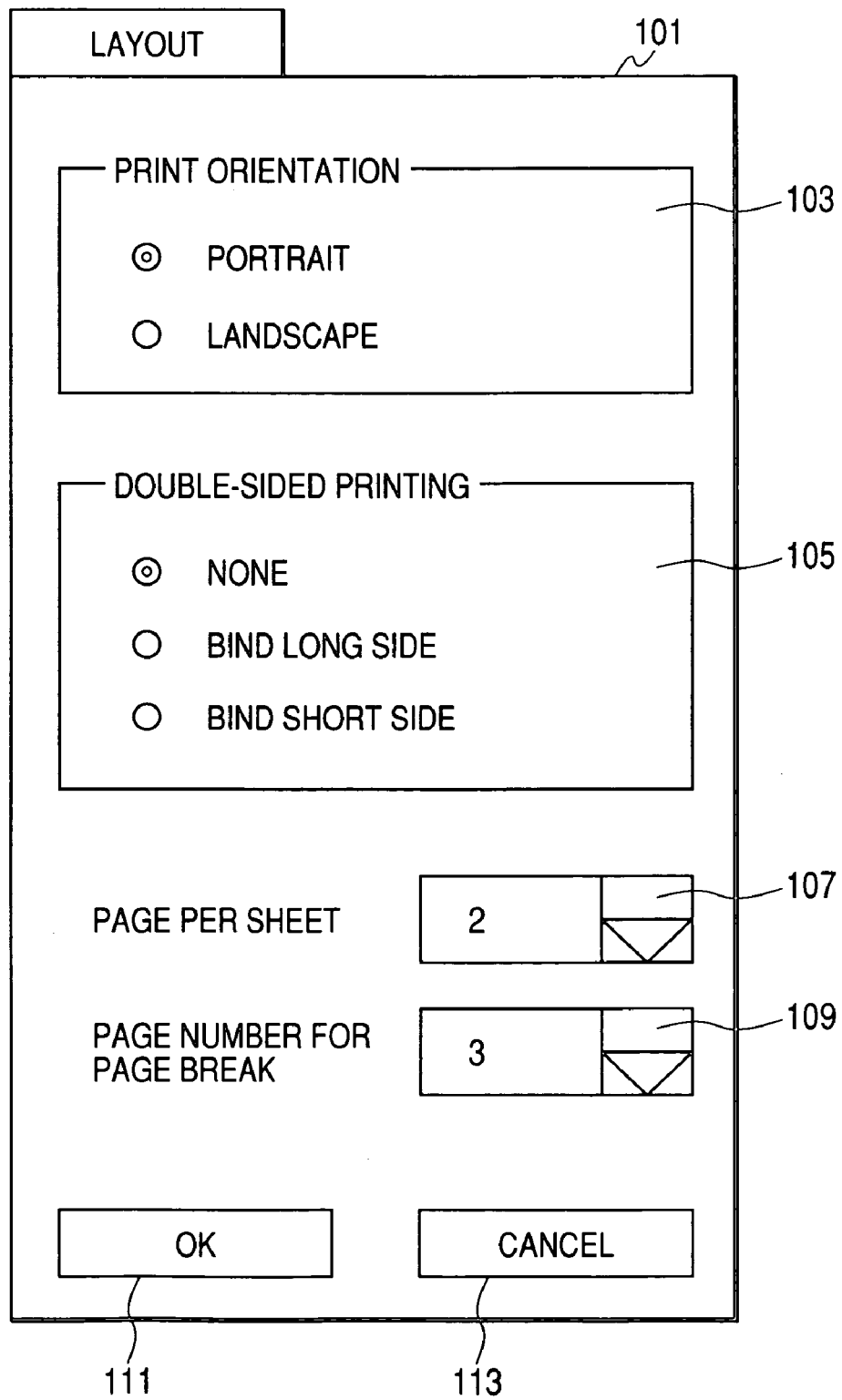
FIG. 5 is a view showing an input screen used for setting printing conditions.

In the case of the present embodiment, when the user performs a predetermined operation, the printer driver UI 72a displays an input screen 101, such as that shown in FIG. 5, on the display 58. Displayed on the input screen 101 are a print orientation designation field 103, a double-sided print designation field 105, a field 107 for designating the number of pages per sheet (the number of pages to be laid out in one page of recording paper by means of page-layout printing) (hereinafter called a "per-sheet page count designation field"), a field 109 for designating the number of pages where a page break is to be inserted (the number of pages per copy) (hereinafter called a "page-break page number designation field"), an OK button 111, a cancel button 113, and the like. By way of the input screen 101, the user can input the number of pages L to be laid out within one page of recording paper during page-layout printing or the page number K per copy required when a plurality of copies are to be printed. Moreover, the user can designate whether or not double-sided printing is to be performed.

During processing operations, the application 71 and the printer driver 72 invoke functions (API: Application Program Interfaces) used for issuing a command to the GDI 75, thereby sending a rendering command to the GDI 75.

The GDI 75 is a module which performs management of a device context (hereinafter called a "DC") which is a virtual rendering field and preparation of print data associated with the DC being subjected to rendering. Print data of EMF (Enhanced Meta File) format and RAW data can be prepared as print data. A format in which print data are to be prepared can be designated by a high-order module which utilizes the GDI 75.

Of the functions of the GDI 75, the DC management function and the data preparation function of EMF format are offered by the OS, and the function for converting processing pertaining to a DC into a command dependent on the printer 2 (a RAW data preparation function) is offered by a device manufacturer as a printer driver GDI 72b.

The GDI 75 prepares a DC, and effects rendering pertaining to the DC in accordance with a rendering command from the application 71 and that from the printer driver 72. In association with the rendering operation pertaining to the DC, print data are prepared. In the case of the present system, the GDI 75 is configured to prepare print data of EMF format upon receipt of a rendering command from the application 71 and that from the printer driver 72. The data of EMF format prepared by the GDI 75 are sent to the spooler 76.

The spooler 76 stores, as a spool file, print data which are prepared by combining, as a single print job, data corresponding to a plurality of pages formed by the GDI 75 on a per-page basis.

The processing unit 80 reads the print data of EMF format from the spool file, analyzes pre-processing images and a method for processing the pre-processing images, generates a rendering command corresponding to post-processing images, and delivers the rendering command to the GDI 75. In accordance with the given rendering command, the GDI 75 generates print data corresponding to the post-processing images by utilization of the functions of the printer drive GDI 72b (when system settings are standard), and the print data are converted into a spool file by the spooler 76. The spooler 76 transmits the print data to the printer 2, and the printer 2 performs printing on the basis of the print data. By means of such processing unit 80, there is performed operation for, e.g., scaling-down the images of L pages and laying out the images within one page of recording paper.

Figure 6:
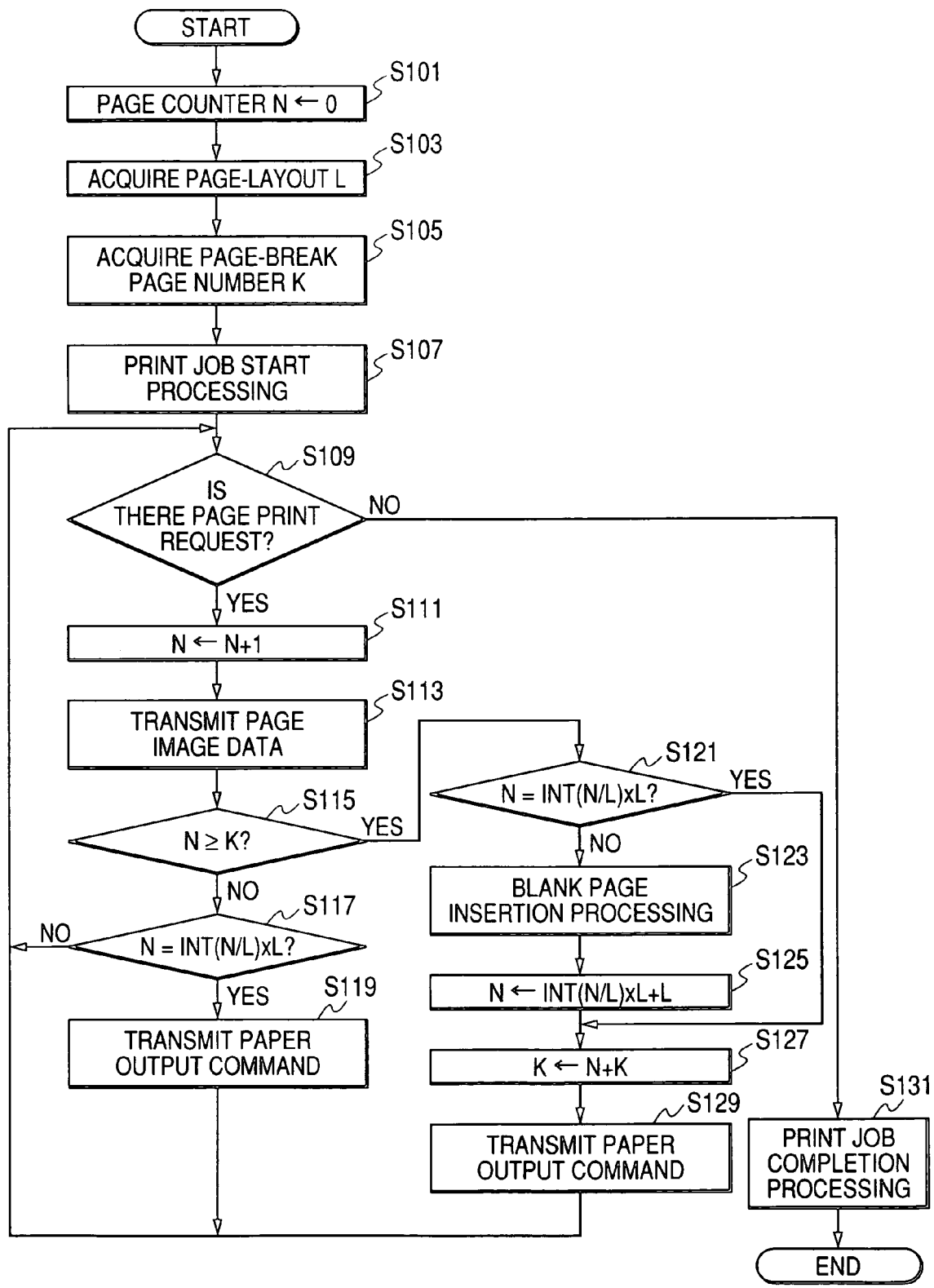
FIG. 6 is a flowchart of page-layout printing according to a first embodiment.

The page-layout printing operation to be executed by the personal computer 51 when the image forming system performs page-layout printing will be described on the basis of a flowchart shown in FIG. 6. This page-layout printing operation is performed when the user has performed predetermined operation to display an input screen 101 such as that shown in FIG. 5 and has designated a value of two or more in the per-sheet page count designation field 107.

When the personal computer 51 commences page-layout printing operation, a page counter N is initialized (S101). This page counter N is a counter used for retaining an accumulated number of pages processed during the course of processing which will be described later. During processing pertaining to S101, the page counter N is set to 0 as an initial value. Further, a page layout L is acquired (S103), and the page-break page number K is acquired (S105). The page layout L is a value designated by the user in the per-sheet page count designation field 107 on the input screen 101 shown in FIG. 5, and the page-break number K is a value designated by the user in the page-break page number designation field 109 on the same input screen 101.

Subsequently, the personal computer 51 executes print job start processing (S107). This processing is processing which is commonly performed by a print system of this type, such as initialization of various internal data or transmission of initialized data to the printer 2.

A check is made as to whether or not a page print request has been issued (S109). Specifically, a page print request is issued every time a rendering command for one page is output from the application 71 shown in FIG. 4 or every time a page break command is output. Therefore, a check is made as to whether or not such a request has been issued.

Here, when a page print request has been issued (YES in S109), one is added to the page counter N (S111), and page image data are transmitted (S113).

Subsequently, the personal computer 51 checks whether or not a relationship of N≧K is acquired with regard to the page counter N and the page-break page number K (S115). The page-break page number K shows the number of pages which are to be handled as one copy by making a page break. When N≧K is acquired (YES in S115), page image data up to a page where a page break is to be inserted as the end of one copy (the final page of one copy) have been transmitted by means of processing pertaining to S113 that has been performed immediately previously. When a relationship of N<K is acquired (NO in S115), transmission of page image data up to a page where a page break is to be inserted as the end of one copy (i.e., the final page of one copy) has not yet been performed.

When a relationship of N<K is acquired (NO in S115), the only requirement is to continue ordinary page-layout printing without awareness of a page break for one copy. Therefore, a check is made as to whether or not the page counter N assumes a value corresponding to a multiple of page layout L (S117). Specifically, a value determined by dividing N by L is rounded to an integer (by dropping the fractional portion of the number). The value is again multiplied by L, to thus produce a product. The product is compared with N. If these values coincide with each other, a dropped fractional portion is not present, and therefore the page counter N can be determined to assume a value corresponding to a multiple of the page layout L. In contrast, when the values do not coincide with each other, there is a dropped fractional portion, and therefore the page counter N can be determined to have failed to assume a value corresponding to a multiple of the page layout L.

If the page counter N has not assumed a value corresponding to the multiple of the page layout L (NO in S117), the essential requirement is to output print data pertaining to the next page without making a switch to the next sheet of recording paper. Accordingly, processing returns to step S109. If the page counter N has assumed a value corresponding to a multiple of page layout L (YES in S117), data used for forming images of L pages on one surface of the recording paper have already been output at that point in time. Therefore, a paper output command is transmitted in order to switch the recording paper to the next sheet of recording paper (S119), whereupon processing returns to processing pertaining to S109.

When a relationship of N≧K is acquired through processing pertaining to S115 (YES in S115), there must be performed control for switching the recording paper to the next sheet of recording paper while awareness of a page break for one copy. Specifically, a check is first made as to whether or not the page counter N assumes a value corresponding to a multiple of the page layout L (S121). This check method is completely identical with processing pertaining to S117.

Here, if the page counter N has not assumed the value corresponding to the multiple of the page layout L (NO in S121), an area of one page or more which can be subjected to printing still remains on one surface of recording paper. Blank page insertion processing is performed so as to prevent the top page of the next copy from being recorded in that area (S123). This blank page insertion processing is presumed to be processing for actually transmitting data representing a blank. However, if there is achieved a state where a blank page is inserted in subsequent processing by performing mere control processing for making a switch to the next sheet of recording paper, data representing a blank do not need to be actually transmitted.

The number of blank pages, which are determined to be inserted by means of processing pertaining to S123, is added to the page counter N (S125). Specifically, a value determined by dividing N by L is rounded to an integer (by dropping the fractional portion of the number). The value is again multiplied by L, to thus produce a product. L is further added to the product. The resultant value is newly set in the page counter N. The fractional portion of the number which is less than L is dropped, and L is further added to the resultant value. Hence, the number of blank pages is added to N according to calculation.

If the page counter N assumes a value corresponding to a multiple of the page layout L in processing pertaining to S121 (YES in S121), images of L pages are laid out in one surface of recording paper, and no printable area is left. In this case, switching is made to the next sheet of recording paper without insertion of a blank page when the images have been laid out up to a page which is to be a page break for one copy. Hence, processing pertaining to S123, S125 is skipped.

When processing pertaining to S125 is completed or an affirmative determination is made through processing pertaining to S121, processing successively proceeds to S127. A value determined by adding the page-break page number K to the page counter N is taken as a new page-break page number K (S127). By means of this processing, a page number to be considered to be a page break for the next copy is reset in both the case where insertion of a blank page has not been performed and the case where insertion of a blank page has been performed. After a paper output command has been transmitted in order to effect switching to the next sheet of recording paper (S119), processing returns to S109.

By means of repetition of the previously-described processing pertaining to S109 to S129, recording paper is switched every time images of L pages are laid out in one surface until a page break in the unit of copy arrives. When the page break in the unit of copy has arrived, recording paper is switched, so long as images of L pages have been laid out on one surface. If images of L pages are not laid out on one surface, a blank page is inserted, whereby recording paper is switched.

If the page print request has disappeared during the course of repetition of processing pertaining to steps S109 to S129 (NO in S109), print completion processing, including initialization of internal data or a report of completion of printing operation to the printer 2, is performed (S131), and the current processing is completed.

As has been described above, according to the page-layout print processing, a switch to the next sheet of recording paper is performed at a page break of each copy by the user merely designating the number of pages L per sheet and the page-break page number K considered to be a page break for a copy unit. Therefore, when page-layout printing is desired to be performed by separating a plurality of copies of print data from each other on a per-copy basis, the copies of print data being identical with each other in terms of the number of pages per copy, there is no necessity for exerting efforts for individually specifying all of the page numbers at which the data are to be separated from each other. Desired printing can be performed readily.

Figure 7:
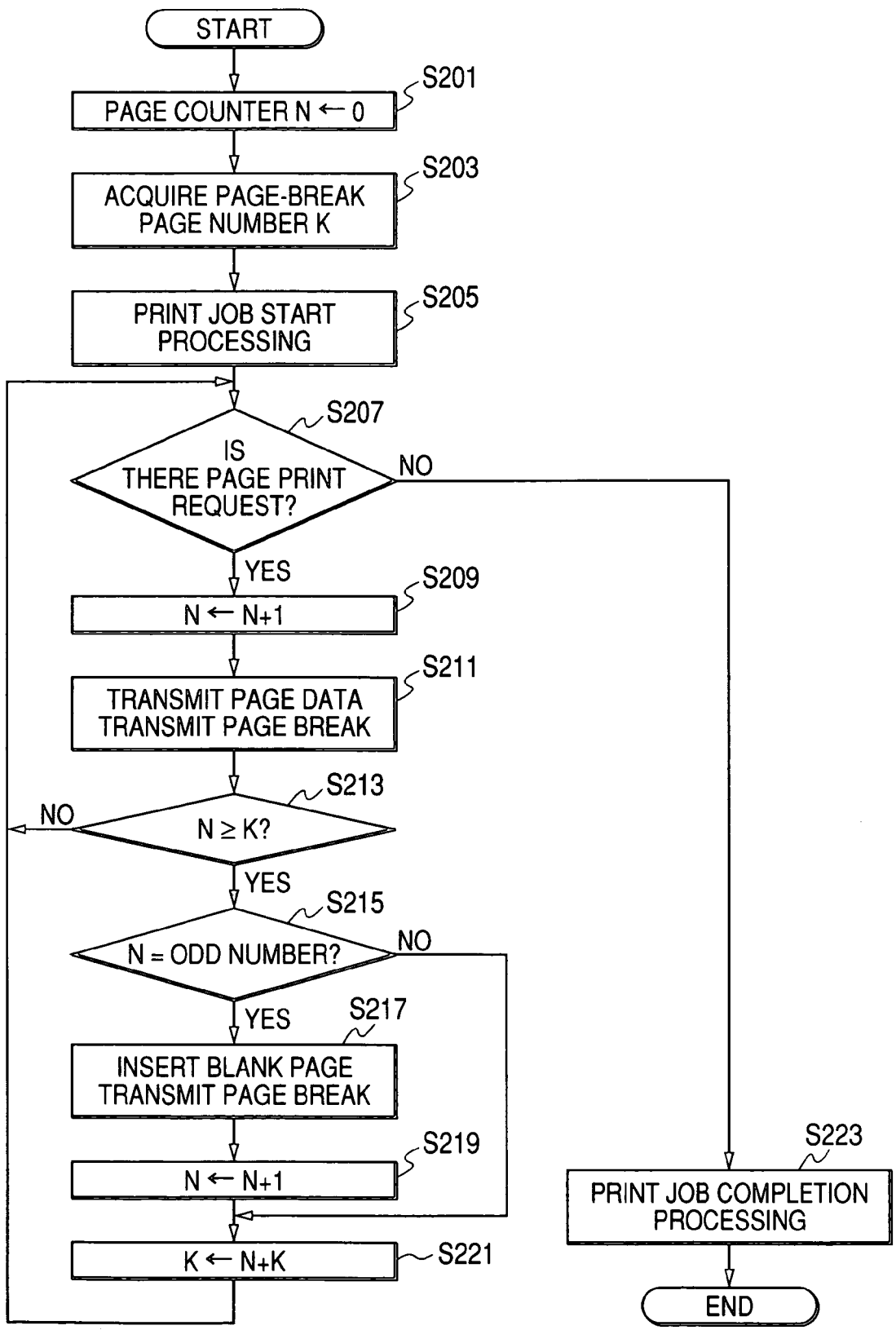
FIG. 7 is a flowchart of double-sided printing of the first embodiment.

Next, when the image forming system performs double-sided printing, the double-sided printing to be executed by the personal computer 51 will be described on the basis of a flowchart shown in FIG. 7. The double-sided printing is performed when the user performs predetermined operation to thus display the input screen 101, such as that shown in FIG. 5, and specifies double-sided printing by way of the double-sided print designation field 105.

When the personal computer 51 commences double-sided printing operation, the page counter N is initialized (S201). This page counter N is a counter used for holding accumulated values of page numbers processed through processing to be described later. In processing pertaining to S201, the page counter N is set to 0 as an initial value. Further, the page-break page number K is acquired (S203). The page-break page number K is a value designated by the user in the page-break page number designation field 109 on the input screen 101.

Subsequently, the personal computer 51 executes print job start processing (S205). This processing is processing, such as initialization of various internal data and transmission of initialized data to the printer 2, commonly performed by a print system of this type.

A check is made as to whether or not a page print request has been issued (S207). Specifically, a page print request is issued every time a rendering command for one page is output from the application 71 shown in FIG. 4, or every time a page break command is output. Hence, a check is made as to whether or not such a command has been issued.

When a page print request has been issued (YES in S207), one is added to the page counter N (S209), and page data and a page break are transmitted (S211). If printing of images on the first surface has been completed at a point in time when the printer 2 has received the page break from the personal computer 51, the paper is inverted, and control for preparing printing of data on the second surface is performed. If printing of data on the second surface has been completed, control for outputting the paper and preparing printing of data on the first surface of a new sheet of paper is performed.

Subsequently, the personal computer 51 checks whether or not $N \geq K$ stands in relation to the page counter N and the page-break page number K (S213). The page-break page number K shows the number of pages to be handled as a page break for one copy. When a relationship of $N \geq K$ stands (YES in S213), page image data up to the page (the final page of one copy) where a page break for one copy is to be made is transmitted by means of processing pertaining to S211 which has been performed immediately beforehand. When a relationship of $N<K$ stands (NO in S213), page image data up to the page (the final page of one copy) where a page break for one copy is to be made) is not performed.

When a relationship of $N<K$ stands (NO in S213), ordinary double-sided printing may continue without awareness of a page break for one copy, and hence processing returns to processing pertaining to S207.

When $N \geq K$ is acquired as determined through processing pertaining to S213 (YES in S213), control for switching recording paper to the next sheet of recording paper must be performed while maintaining awareness of a page break for one copy. Specifically, a check is made as to whether or not the page counter N assumes an odd number (S215).

Here, when the page number N assumes an odd number (YES in S215), a printable area still remains on the second surface of the recording paper. However, recording is desired to be performed so as to prevent recording of the top page of the next copy on the second surface. Hence, insertion of a blank page and page break transmission processing are performed (S217). This blank page insertion processing is based on the assumption of processing for actually transmitting data representing a blank. However, if a state where a blank page is inserted is achieved by means of performing only the page break transmission processing, actual transmission of data representing a blank may be omitted.

A blank page corresponding to one page is inserted through processing pertaining to S217, and hence one, which is the number of pages, is added to the page counter N (S219).

When the page counter N does not assume an odd number as determined through processing pertaining to S215 (NO in S215), printing of data up to the second surface of the recording paper is considered to have been completed. In this case, a switch to the next sheet of recording paper is performed without insertion of a blank page upon completion of printing of data up to the page, where a page break for one copy is to be made. For this reason, processing pertaining to S217, S219 is skipped.

When processing pertaining to S219 is completed or when a negative determination is made through processing pertaining to S215, processing proceeds to processing pertaining to S221. A value determined by adding the page-break page number K to the page counter N is taken as a new page-break page number K (S221). By means of this processing, the number of pages to be considered to be the next page break are reset both when insertion of a blank page is performed and when insertion of a blank page is not performed. After processing pertaining to S221 has been completed, processing returns to processing pertaining to S207.

Through repetition of previously-described processing pertaining to S207 to S221, recording paper is switched every time recording of data on the first and second surfaces of the recording paper is performed, until arrival of a page break for a copy unit. Upon arrival of a page break for a copy unit, recording paper is switched, so long as printing of data on the second surface has been completed. If printing of data has been performed solely up to the first surface, a blank page is inserted into the second surface, and recording paper is switched.

If the page print request has disappeared during the course of repetition of previously-described processing pertaining to S207 to S221 (NO in S207), print job completion processing, including initialization of internal data or a report of completion of printing to the printer 2, is performed (S223), and the present processing is terminated.

As has been described above, according to the double-sided printing, a switch to the next sheet of recording paper is performed at a page break for each copy by means of the user designating only the page-break page number K to be considered to be a page break for copy unit. Consequently, when double-sided printing is desired to be performed while the print data of a plurality of copies, which are identical with each other in terms of the number of pages per copy, are separated on a per-copy basis, there is no necessity for laborious efforts for individually designating all of the page numbers where page breaks are to be made, and desired printing can be performed easily.

Second Embodiment

An embodiment differing from the first embodiment will now be described. A difference between the present embodiment and the first embodiment lies in processing executed by the previously-described personal computer 51 and that executed by the printer 2. Since no difference exists between the personal computer 51 and the printer 2 in view of hardware or the like, in the following description a detailed explanation is directed chiefly toward a difference between the first embodiment and the present embodiment, and explanations about the common configuration are omitted.

First, processing to be performed when an image forming system of the second embodiment performs page-layout printing will be described. In the image forming system of the first embodiment, the personal computer 51 receives printing conditions designated by the user; generates print data by means of which page-layout printing is performed in accordance with the printing conditions; and transmits the thus-generated print data to the printer 2. In the second embodiment, the personal computer 51 receives printing conditions designated by the user; transmits, to the printer 2, print data which will serve as a basis for the printing conditions; and performs printing conditions by means of which the printer 2 performs page-layout printing in accordance with received printing conditions.

Figure 8:
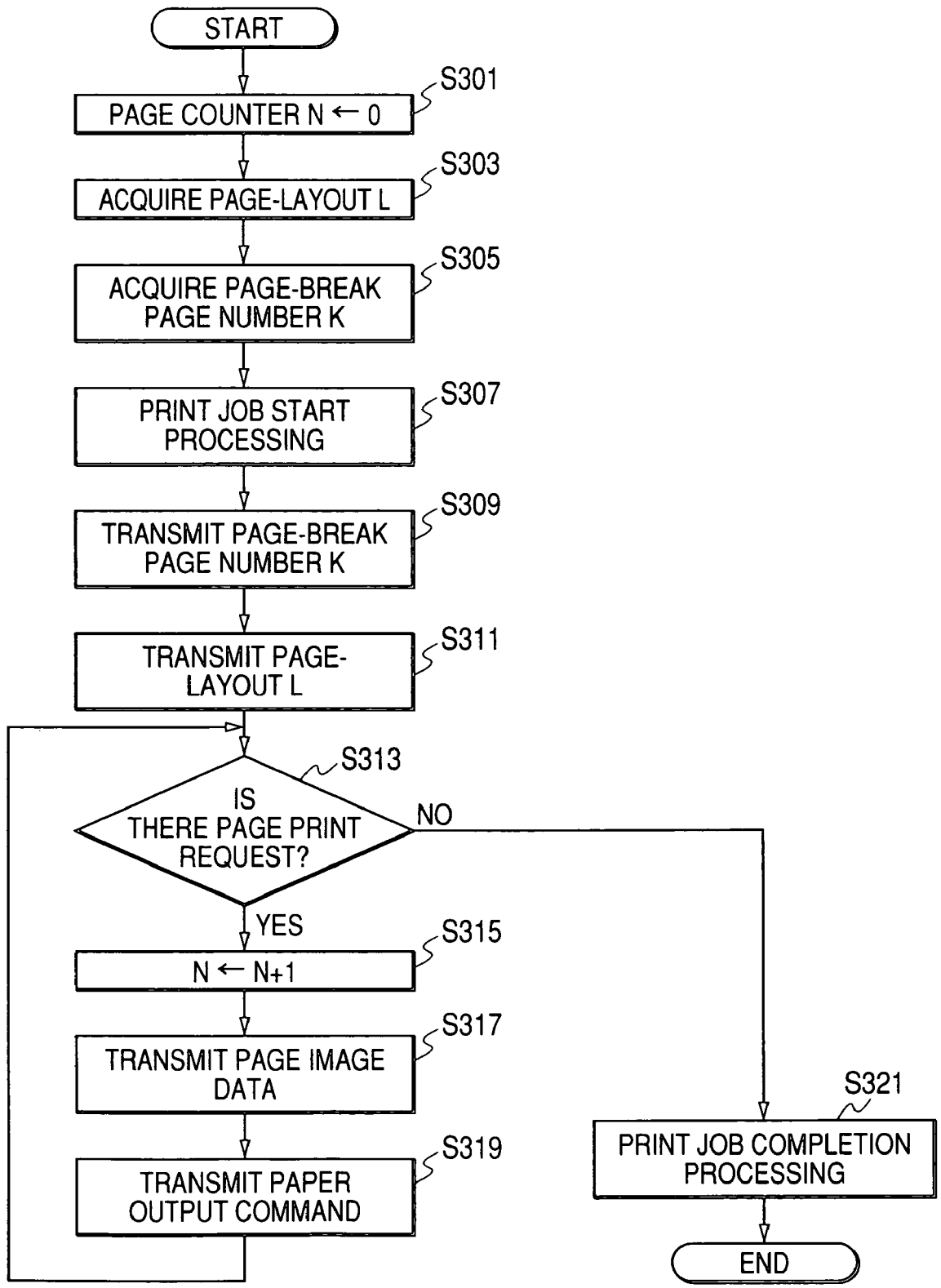
FIG. 8 is a flowchart of personal-computer-end page-layout printing according to a second embodiment.

First, personal-computer-end page-layout printing to be executed by the personal computer 51 will be described on the basis of the flowchart shown in FIG. 8. This personal-computer-end page-layout printing is performed when the user performs predetermined operation to thus display the input screen 101, such as that shown in FIG. 5, and designates a value of "2" or more in the per-sheet page count designation field 107.

When the personal computer 51 commences the personal-computer-end page-layout processing operation, the page counter N is first initialized (S301). This page counter N is a counter used for retaining an accumulated value corresponding to the number of pages processed during the course of processing which will be described later. During processing pertaining to S301, 0 is set as an initial value. Further, a page layout L is acquired (S303), and the page-break page number K is acquired (S305). The page layout L is a value designated by the user in the per-sheet page count designation field 107 on the input screen 101 shown in FIG. 5, and the page-break page number K is a value designated by the user in the page-break page number designation field 109 on the same input screen 101.

Subsequently, the personal computer 51 executes print job start processing (S307). This processing is processing which is commonly performed by a print system of this type, such as initialization of various internal data or transmission of initialized data to the printer 2.

After the print job start processing has been completed, the page layout L acquired through processing pertaining to S303 is transmitted to the printer 2 (S309), and the page-break page number K acquired through processing pertaining to S305 is transmitted to the printer 2 (S311).

A check is made as to whether or not a page print request has been issued (S313). Specifically, a page print request is issued every time a rendering command for one page is output from the application 71 shown in FIG. 4 or every time a page break command is output. Therefore, a check is made as to whether or not such a request has been issued.

Here, when a page print request has been issued (YES in S313), one is added to the page counter N (S315), and page image data are transmitted to the printer 2 (S317). After a paper output command has been transmitted (S319), processing returns to processing pertaining to S313. Specifically, by means of processing pertaining to S313 to S319, the personal computer 51 performs solely operation for sequentially transmitting data, which are on a per-page basis, to the printer 2 in the sequence of pages. In the second embodiment, the personal computer 51 does not perform the operation for inserting a blank page, or the like, which has been performed by the personal computer 51 in the first embodiment.

If the page print request has disappeared during the course of repetition of processing pertaining to steps S313 to S319 (NO in S313), initialization of internal data or print job termination processing including a report of completion of printing operation to the printer 2 is performed (S321), and the current processing is completed.

Figure 9:
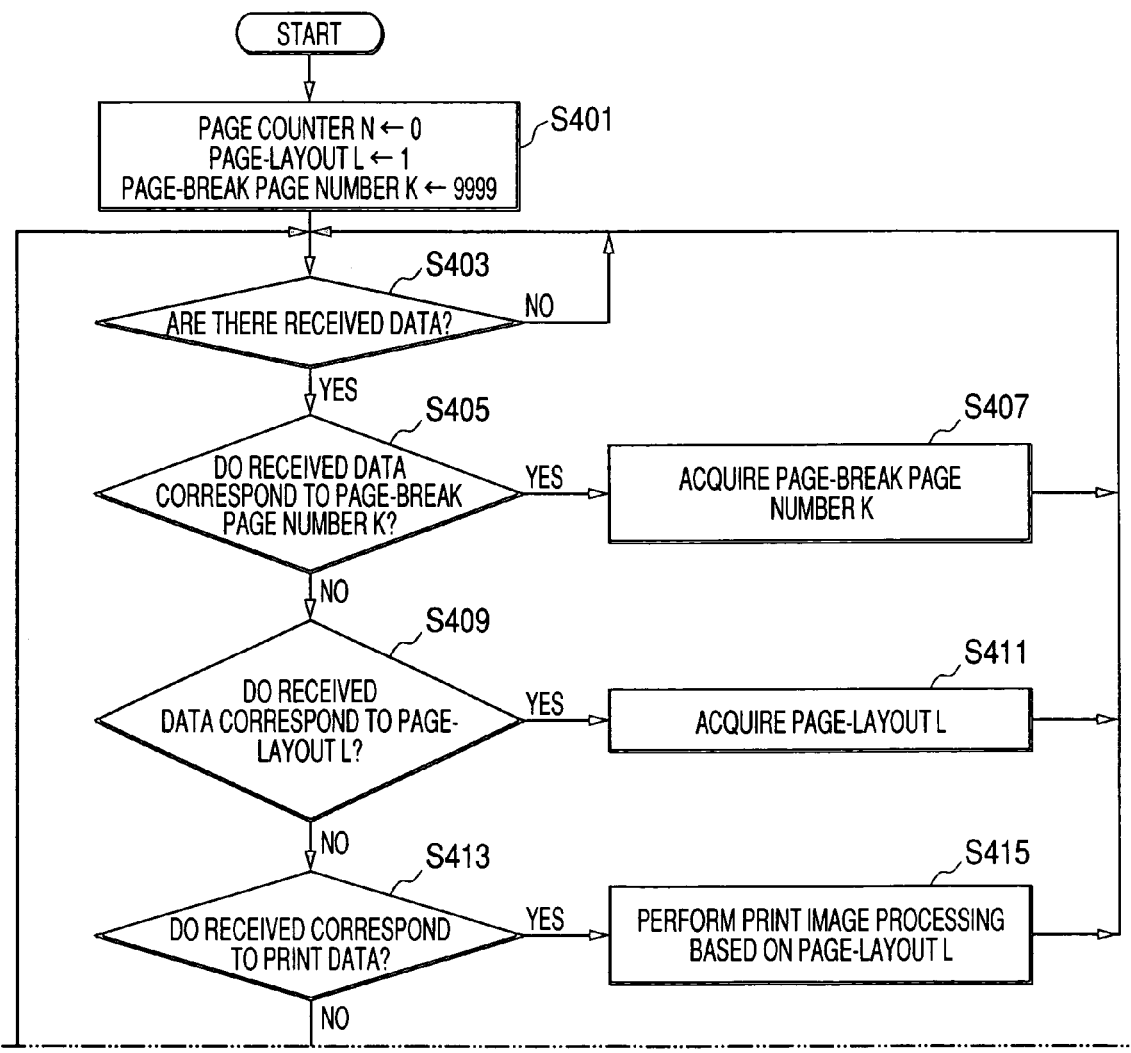
FIG. 9 is a flowchart of printer-end page-layout printing of the second embodiment.

Printer-end page-layout printing operation to be executed by the printer 2 will be described by reference to a flowchart shown in FIG. 9. This printer-end page-layout processing operation is executed when the personal computer 51 has performed the above-described personal-computer-end page-layout printing operation.

When the printer 2 has commenced printer-end page-layout processing operation, the page counter N, the page layout L, and the page-break page number K are initialized (S401). This page counter N is a counter used for retaining an accumulated value corresponding to the number of pages processed during the course of processing which will be described later. During processing pertaining to S401, 0 is set an initial value of the page counter N. In subsequent processing, the data received from the personal computer 51 are set as the page layout L. When the page layout L is not received, the printer 2 does not perform the page-layout printing. Hence, "1" is set as an initial value of the page layout L. Similarly, the data received from the personal computer 51 are set as the page-break page number K in subsequent processing. In relation to the page-break page number K, "9999" is set as an initial value. The reason for this setting is to prevent occurrence of a case where a page-break page number is determined to be achieved, which would otherwise be caused when the page-break page number K has not been received, by setting the page-break page number K to a sufficiently large value. More specifically, in the present embodiment, printing of a total pages of 9999 is assumed to be impossible, and an initial value of the page-break page value K is set to "9999." If printing of a total pages of 9999 is possible, a specific initial value may be determined arbitrarily; for instance, the initial value of the page-break page number K may be set to "99999" or a like value.

Subsequently, when receiving no data from the personal computer 51, the printer 2 remains in a standby condition (NO in S403). If the printer has received data (YES in S403), processing proceeds to processing pertaining to S405.

During processing pertaining to S405, when the received data correspond to the page-break page number K (YES in S405), the page-break page number K is acquired (S407). The page-break page number K is a value designated by the user in the page-break page number designation field 109 on the input screen 101 shown in FIG. 5. The page-break page number K corresponds to data transmitted from the personal computer 51 through processing pertaining to S311. After processing pertaining to S407 has been completed, processing returns to processing pertaining to S403. If the received data do not correspond to the page-break page number K as determined through processing pertaining to S405, (NO in S405), processing proceeds to S409.

During processing pertaining to S409, when the received data correspond to the page layout L (YES in S409), the page layout L is acquired (S411). The page layout L is a value designated by the user in the per-sheet page count designation field 107 on the input screen 101 shown in FIG. 5. The page layout L corresponds to data transmitted from the personal computer 51 through previously-described processing pertaining to S309. After processing pertaining to S411 has been completed, processing returns to processing pertaining to S403. If the received data do not correspond to the page layout L as determined through processing pertaining to S409 (NO in S409), processing proceeds to S413.

During processing pertaining to S413, if received data are print data (YES in S413), print image processing based on the layout L is performed (S415). Specifically, when the data transmitted through previously-described processing pertaining to step S317 are received, the received data are print data. Therefore, in consideration of a relationship between the page layout L and the page counter N, the image forming section 42 performs image forming operation. Consequently, a scaled-down image corresponding to the received print data is formed at a position where desired page-layout printing is about to be effected. After processing pertaining to S415 has been completed, processing returns to S403. In contrast, when the received data are determined not to be print data through processing pertaining to S413 (NO in S413), processing proceeds to S417.

During processing pertaining to S417, a check is made as to whether or not the print job has been completed (S417). Immediately after processing has been initialized, the print job is usually not completed (NO in S417). Hence, another check is continuously made as to whether or not a page print request has been issued (S421). Specifically, when the paper output command transmitted through previously-described processing pertaining to S319 has been received, the page print request is determined to exist (YES in S421). In contrast when the page print request is determined not to exist (NO in S421), processing returns to S403.

When the page print request exists (YES in S421), the printer 2 adds 1 to the page counter N (S423), thereby checking whether or not a relationship $N \geq K$ stands between the page counter N and the page-break page number K (S425). The page-break page number K shows a page number to be handled as a page break for one copy. When the relationship $N \geq K$ stands (YES in S425), the image forming section 42 has performed print image processing up to a page (the final page of one copy), which is to be taken as a page break for one copy by means of immediately-before-executed processing pertaining to S413. When a relationship of N<K stands (NO in S425), the image forming section 42 has not yet performed print image processing up to the page (the final page of one copy), which is to be taken as a page break for one copy.

When a relationship of N<K stands (NO in S425), the essential requirement is to continue the ordinary page-layout printing without awareness of a page break for one copy. Therefore, a check is made as to whether or not the page counter N has assumed a value corresponding to a multiple of the page layout L (S427) Specifically, a value determined by dividing N by L is rounded (by dropping off a fractional portion of the value), and the value is again multiplied by L, to thus produce a product. The product is compared with N. If these values coincide with each other, a dropped fractional portion is not present, and therefore the page counter N can be determined to assume a value corresponding to a multiple of the page layout L. In contrast, when these values do not coincide with each other, there is a dropped fractional portion, and therefore the page counter N can be determined to have failed to assume a value corresponding to a multiple of the page layout L.

If the page counter N has not assumed a value corresponding to the multiple of the page layout L (NO in S427), the essential requirement is to output print data pertaining to the next page without making a switch to the next sheet of recording paper. Accordingly, processing returns directly to step S403. If the page counter N has assumed a value corresponding to a multiple of page layout L (YES in S427), data used for forming images of L pages on one surface of the recording paper have already been output at that point in time. Therefore, in order to switch the recording paper to the next sheet of recording paper, the image forming section 42 performs printing and paper output operation (S429), and processing returns to processing pertaining to S403.

When a relationship of $N \geq K$ is acquired as determined through processing pertaining to S425 (YES in S425), there must be performed control for switching the recording paper to the next sheet of recording paper while maintaining awareness of a page break for one copy. Specifically, a check is first made as to whether or not the page counter N assumes a value corresponding to a multiple of the page layout L (S431). This check method is completely identical with processing pertaining to S427.

Here, if the page counter N has not assumed the value corresponding to the multiple of the page layout L (NO in S431), an area of one page or more which can be subjected to printing must be left on one surface of the recording paper. Blank page insertion processing is performed so as to prevent the top page of the next copy from being recorded in that area (S433). This blank page insertion processing is presumed to be processing for forming a blank image. However, if a state in which a blank page is inserted is achieved in subsequent processing by performing mere control processing for making a switch to the next sheet of recording paper, the printer 2 does not need to actually perform operation for forming a blank image.

The number of the blank page to be inserted by means of processing pertaining to S433 is added to the page counter N (S435). Specifically, a value determined by dividing N by L is rounded to an integer (by dropping off a fractional portion of the value). The value is again multiplied by L, to thus produce a product. L is further added to the product. The resultant value is newly set in the page counter N. This means that the fractional portion of the number which is less than L is dropped; and that L is further added to the resultant value. Hence, the number of blank pages is added to N according to calculation.

In contrast, if the page counter N assumes a value corresponding to a multiple of the page layout L in processing pertaining to S431 (YES in S431), images of L pages are laid out on one surface of recording paper, and no printable area is left. In this case, switching is made to the next sheet of recording paper without insertion of a blank page when the images have been laid out up to a page which is to be taken as a page break for one copy. Hence, processing pertaining to S433, S435 is skipped.

When processing pertaining to S435 is completed or an affirmative determination is made through processing pertaining to S431, processing successively proceeds to S437. A value determined by adding the page-break page number K to the page counter N is taken as a new page-break page number K (S437). By means of this processing, a page number to be considered to be a page break for the next copy is reset in both when insertion of a blank page has not been performed and when insertion of a blank page has been performed. After a paper output command has been transmitted in order to effect switching to the next sheet of recording paper (S439), processing returns to S403.

By means of repetition of previously-described processing pertaining to S403 to S439, recording paper is switched every time images corresponding to L pages are laid out in one surface until arrival of a page break for copy unit. Upon arrival of the page break in the unit of copy, recording paper is switched, so long as images corresponding to L pages have been laid out on one surface. If images corresponding to L pages have not been laid out on one surface, a blank page is inserted, whereby recording paper is switched.

If the page print is determined to have been completed during the course of repetition of processing pertaining to steps S403 to S439 (YES in S417), print completion processing, including initialization of internal data, is performed (S441), whereby the present processing is terminated.

As has been described above, according to the page-layout print processing, a switch to the next sheet of recording paper is performed at a page break of each copy by the user merely designating the number of pages L per sheet and the page-break page number K to be considered to be a page break for a copy unit. Therefore, when page-layout printing is desired to be performed by separating a plurality of copies of print data from each other on a per-copy basis, the copies of print data being identical with each other in terms of the number of pages per copy, there is no necessity for consuming efforts for individually specifying all of the page numbers at which the data are to be separated from each other. Desired printing can be performed readily.

First, processing to be performed when an image forming system of the second embodiment performs double-sided printing will be described. In the image forming system of the first embodiment, the personal computer 51 receives printing conditions designated by the user; generates print data by means of which double-sided printing is performed in accordance with the printing conditions; and transmits the thus-generated print data to the printer 2. In the second embodiment, the personal computer 51 receives printing conditions designated by the user; transmits, to the printer 2, print data which are to serve as a basis for the printing conditions; and performs printing conditions by means of which the printer 2 performs double-sided printing in accordance with received printing conditions.

Figure 10:
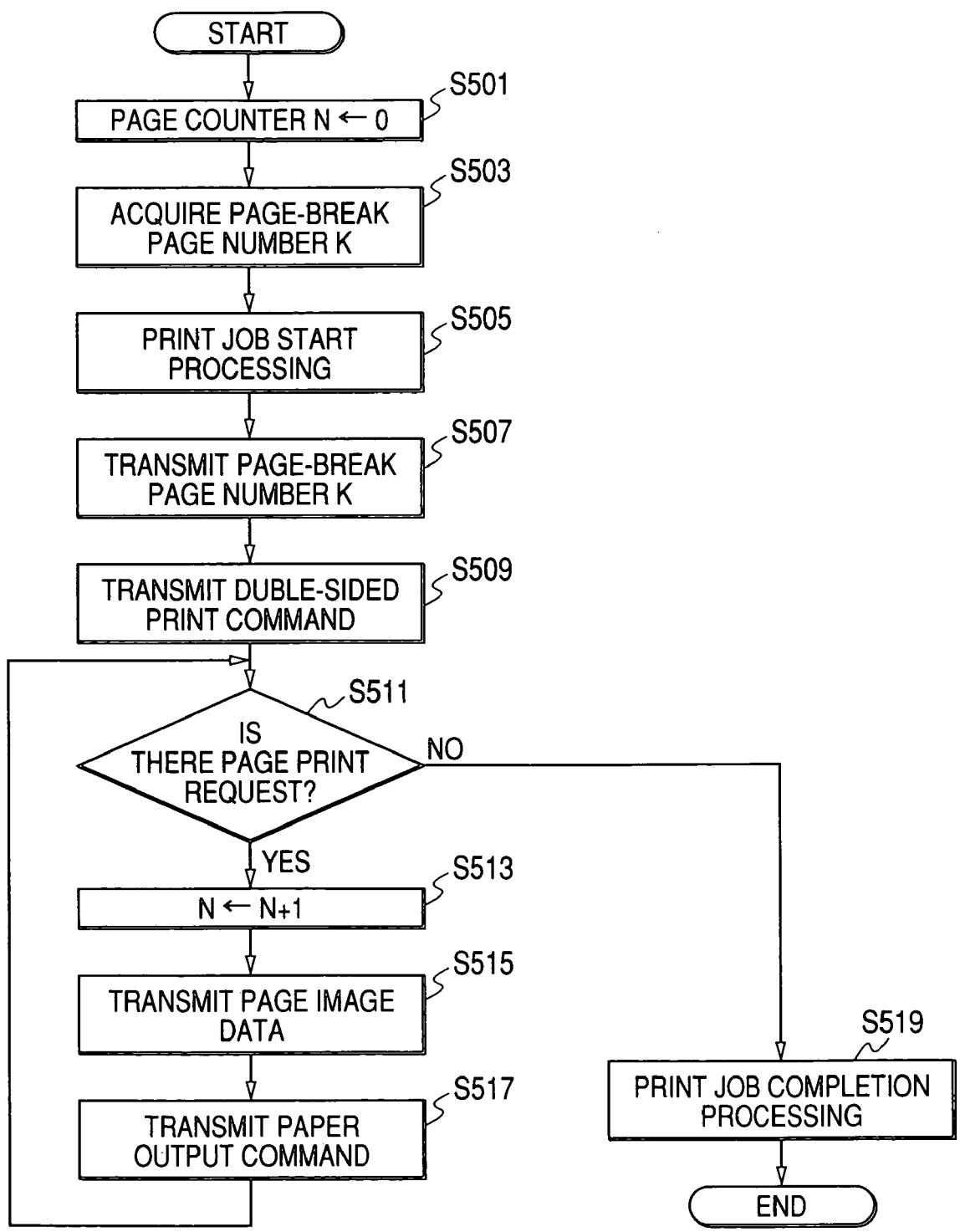
FIG. 10 is a flowchart of personal-computer-end double-sided printing according to the second embodiment.

First, personal-computer-end double-sided printing to be executed by the personal computer 51 will be described on the basis of the flowchart shown in FIG. 10. This personal-computer-end double-sided printing is performed when the user performs predetermined operation to thus display the input screen 101, such as that shown in FIG. 5, and designates double-sided printing in the double-sided print designation field 105.

When the personal computer 51 commences the personal-computer-end double-sided processing operation, the page counter N is first initialized (S501). This page counter N is a counter used for retaining an accumulated value corresponding to the number of pages processed during the course of processing which will be described later. During processing pertaining to S501, 0 is set as an initial value. Further, the page-break page number K is acquired (S503). The page-break page number K is a value designated by the user in the page-break page number field 109 on the same input screen 101.

Subsequently, the personal computer 51 executes print job start processing (S505). This processing is processing which is commonly performed by a print system of this type, such as initialization of various internal data or transmission of initialized data to the printer 2.

After the print job start processing has been completed the page-break page number K acquired through processing pertaining to S503 is transmitted to the printer 2 (S507), and a double-sided printing command is transmitted (S509).

A check is made as to whether or not a page print request has been issued (S511). Specifically, a page print request is issued every time a rendering command for one page is output from the application 71 shown in FIG. 4 or every time a page break command is output. Therefore, a check is made as to whether or not such a request has been issued.

Here, when a page print request has been issued (YES in S511), one is added to the page counter N (S513), and page image data are transmitted to the printer 2 (S515). After a paper output command has been transmitted (S517), processing returns to processing pertaining to S511. Specifically, by means of processing pertaining to S511 to S517, the personal computer 51 performs solely operation for sequentially transmitting data, which are on a per-page basis, to the printer 2 in the sequence of pages. In the second embodiment, the personal computer 51 does not perform the operation for inserting a blank page, or the like, which has been performed by the personal computer 51 in the first embodiment.

If the page print request has disappeared during the course of repetition of processing pertaining to steps S511 to S517 (NO in S511), initialization of print data or print job termination processing including a report of completion of printing operation to the printer 2 is performed (S519), and the current processing is completed.

Figure 11:
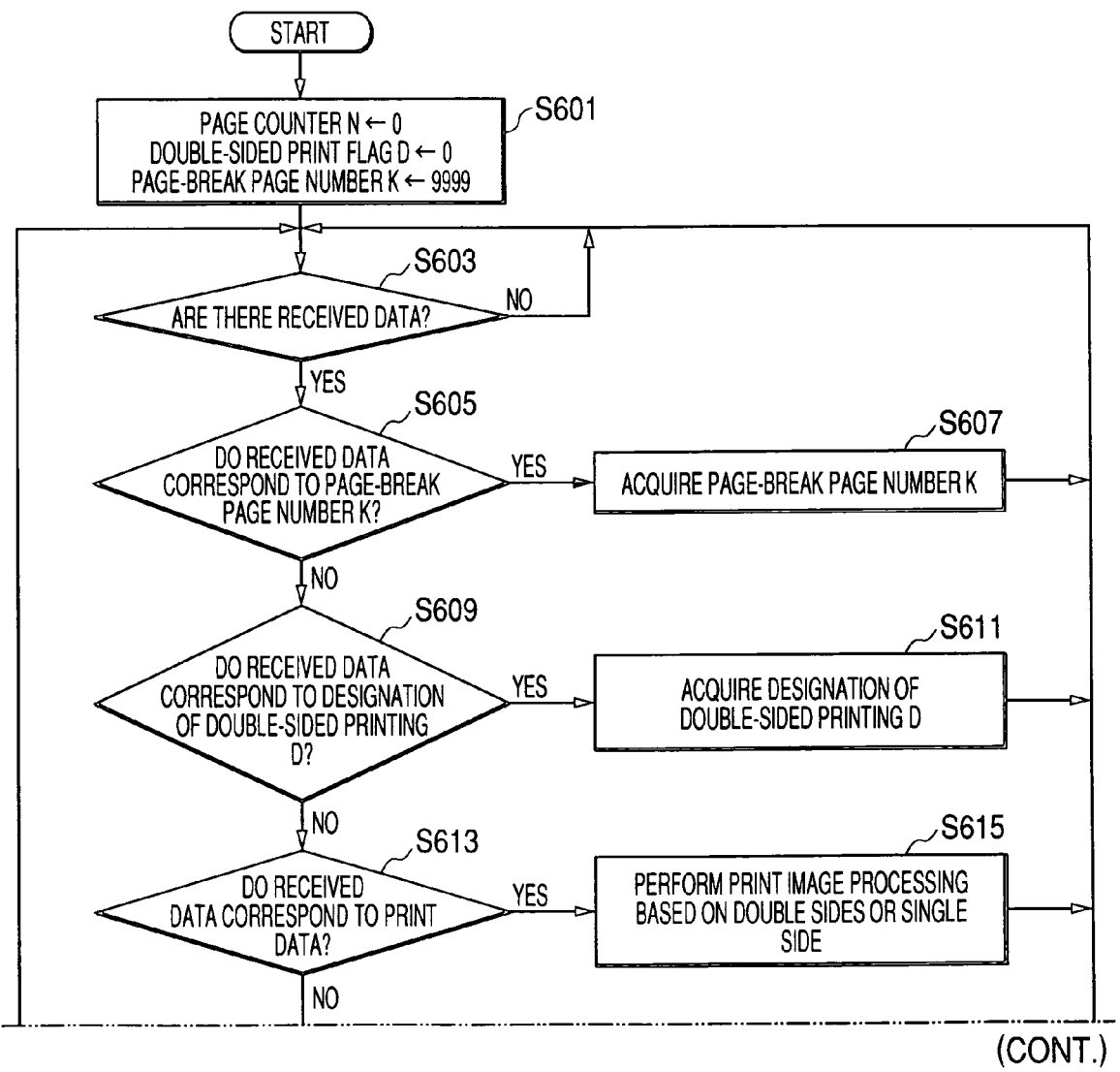
FIG. 11 is a flowchart of printer-end double-sided printing of the second embodiment.

Printer-end double-sided printing operation to be executed by the printer 2 will be described on the basis of a flowchart shown in FIG. 11. This printer-end double-sided processing operation is executed when the personal computer 51 has performed the above-described personal-computer-end double-sided printing operation.

When the printer 2 has commenced printer-end double-sided processing operation, the page counter N, a double-sided print flag D, and the page-break page number K are initialized (S601). This page counter N is a counter used for retaining an accumulated value corresponding to the number of pages processed during the course of processing which will be described later. During processing pertaining to S601, 0 is set an initial value of the page counter N. In subsequent processing, the data received from the personal computer 51 are set as the double-sided print flag D. The personal computer 51 transmits D=0 when a switch to single-sided printing is effected, and transmits D=1 when a switch to double-sided printing is effected. When the double-sided print flag D is not received, the printer 2 performs single-sided printing. Hence, 0 is set as an initial value of the double-sided print flag D. Further, in subsequent processing, the data received by the personal computer 51 are set as the page-break page number K. In relation to the page-break page number K, "9999" is set as an initial value. The reason for this is to prevent occurrence of a case where a page-break page number is determined to be achieved, which would otherwise be caused when the page-break page number K has not been received, by setting the page-break page number K to a sufficiently large value. More specifically, in the present embodiment, printing of a total pages of 9999 is assumed to be impossible, and an initial value of the page-break page value K is set to "9999." If printing of a total pages of 9999 is possible, a specific initial value may be determined arbitrarily; for instance, the initial value of the page-break page number K may be set to "99999" or a like value.

Subsequently, when receiving no data from the personal computer 51, the printer 2 remains in a standby condition (NO in S603). If the printer has received data (YES in S603), processing proceeds to processing pertaining to S605.

During processing pertaining to S605, when the received data correspond to the page-break page number K (YES in S605), the page-break page number K is acquired (S607). The page-break page number K is a value designated by the user in the page-break page number designation field 109 on the input screen 101 shown in FIG. 5. The page-break page number K corresponds to data transmitted from the personal computer 51 through processing pertaining to S507. After processing pertaining to S607 has been completed, processing returns to processing pertaining to S603. If the received data do not correspond to the page-break page number K as determined through processing pertaining to S605, (NO in S605), processing proceeds to S609.

During processing pertaining to S609, when the received data correspond to the double-sided print command (YES in S609), the double-sided print flag D=1 is acquired (S611). The double-sided print flag D is a flag which assumes a value of D=1 when the user has designated double-sided printing in the double-sided print designation field 105 on the input screen 101 shown in FIG. 5 and assumes a value of D=0 when double-sided printing is not designated. The flag corresponds to data which are transmitted from the personal computer 51 by means of previously-described processing pertaining to S509. After completion of processing pertaining to S611, processing returns to processing pertaining to S603. If the received data do not correspond to the double-sided print flag D as determined through processing pertaining to S609 (NO in S609), processing proceeds to S613.

During processing pertaining to S613, if received data are print data (YES in S613), print image processing pertaining to double sides/single side is performed (S615). Specifically, when the data transmitted through previously-described processing pertaining to step S515 are received, the received data are print data. Therefore, an image corresponding to the received print data is formed. After processing pertaining to S615 has been completed, processing returns to S603. In contrast, when the received data are determined not to be print data through processing pertaining to S613 (NO in S613), processing proceeds to S617.

During processing pertaining to S617, a check is made as to whether or not the print job has been completed (S617). Immediately after processing has been initialized, the print job is usually not completed (NO in S617). Hence, another check is continuously made as to whether or not a page print request has been issued (S621). Specifically, when the paper output command transmitted through previously-described processing pertaining to S517 has been received, the page print request is determined to exist (YES in S621). In contrast, when the page print request is determined not to exist (NO in S621), processing returns to S603.

When the page print request has been issued (YES in S621), the printer 2 adds 1 to the page counter N (S623), thereby checking whether or not the double-sided print flag D has a value D=1 (S625). Here, when the double-sided print flag does not have a relationship of D=1 (D=0) (NO in S625), the essential requirement is to perform ordinary single-sided printing without awareness of a page break for one copy. Hence, printing and paper output operation are performed immediately (S627). After processing pertaining to S627 has been completed, processing returns to processing pertaining to S603.

During processing pertaining to S625, when the double-sided print flag D has a value D=1 (YES in S625), a check is made as to whether or not a relationship N≧K stands between the page counter N and the page-break page number K (S629). The page-break page number K shows a page number to be handled as a page break for one copy. When the relationship N≧K stands (YES in S629), the image forming section 42 has performed print image processing up to a page (the final page of one copy), which is to be taken as a page break for one copy by means of immediately-before-executed processing pertaining to S613. When a relationship N<K stands (NO in S629), the image forming section 42 has not yet performed print image processing up to the page (the final page of one copy), which is to be taken as a page break for one copy.

When a relationship N≧K stands (YES in S629), there must be performed control for switching the recording paper to the next sheet of recording paper while maintaining awareness of a page break for one copy. Specifically, a check is first made as to whether or not the page counter N assumes an odd number (S631).

Here, when the page number N assumes an odd number (YES in S631), a printable area still remains on the second surface of the recording paper. However, recording is desired to be performed so as to prevent recording of the top page of the next copy on the second surface. Hence, blank page insertion processing is performed (S633). This blank page insertion processing is based on the assumption of processing for actually forming a blank image. However, if a state where a blank page is inserted is achieved by means of performing in subsequent processing only control operation for effecting a switch to the next sheet of recording paper, the printer 2 does not need to actually form a blank image.

A blank page corresponding to one page is inserted through processing pertaining to S633, and hence one, which is the number of pages, is added to the page counter N (S635).

When the page counter N does not assume an odd number as determined through processing pertaining to S631 (NO in S631), printing of data up to the second surface of the recording paper is considered to have been completed. In this case, a switch to the next sheet of recording paper is performed without insertion of a blank page upon completion of printing of data up to the page, where a page break for one copy is to be made. For this reason, processing pertaining to S633, S635 is skipped.

When processing pertaining to S635 is completed or when a negative determination is made through processing pertaining to S637, processing proceeds to processing pertaining to S637. A value determined by adding the page-break page number K to the page counter N is taken as a new page-break page number K (S637). By means of this processing, the number of pages to be considered to be the next page break are reset both when insertion of a blank page is performed and when insertion of a blank page is not performed. After printing and paper output processing have been performed in order to make a switch to the next sheet of recording paper (S639), processing returns to processing pertaining to S603.

When a relationship N<K stands (NO in S629), the ordinary page-layout printing is continued without awareness of a page break for one copy. Therefore,, a check is made as to whether or not the page counter N assumes an even number (S641). When the page counter N assumes an even number (YES in S641), data used for forming images corresponding to both surfaces of recording paper have been output at that point in time. The image forming section 43 performs printing and paper output operation in order to make a switch to the next sheet of recording paper (S643), and processing returns to processing pertaining to S603. When the page counter N does not assume an even number (assumes an odd number) (NO in S641), only data used for forming images corresponding to one surface of recording paper have been output. Hence, processing pertaining to S643 is skipped in this stage, and processing returns directly to processing pertaining to S603.

Through repetition of previously-described processing pertaining to S603 to S643, recording paper is switched every time recording of data on both surfaces of the recording paper is performed until arrival of a page break for a copy unit comes. Upon arrival of a page break for a copy unit, recording paper is switched, so long as printing of images to be formed both surfaces has been completed. If printing of only images corresponding to one surface has been performed, the recording paper is switched. If only the images to be formed one surface have been printed, a blank page is inserted into the second surface, and the recording paper is switched.

If the print job is determined to have been completed through repetition of processing pertaining to S603 to S643 (YES in S617), print completion processing, including initialization of internal data, is performed (S645), and the current processing is terminated.

As has been described above, according to the double-sided printing which is performed by cooperation of the personal computer 51 and the printer 2, a switch to the next sheet of recording paper is performed at a page break of each copy by the user merely designating the number of pages L per sheet and the page-break page number K considered to be a page break for a copy unit. Therefore, when page-layout printing is desired to be performed by separating a plurality of copies of print data from each other on a per-copy basis, the copies of print data being identical with each other in terms of the number of pages per copy, there is no necessity for consuming efforts for individually specifying all of the page numbers at which the data are to be separated from each other. Desired printing can be performed readily.

In the second embodiment that has been described thus far, the personal computer 51 prepares print data, the number of layout pages L, and the page-break page number K for the page-layout printing and double-sided printing. However, determination of a page to be considered to be a page break for copy unit and control operation for inserting a blank page are executed by the printer 2. Hence, the load imposed on the personal computer 51 can be lessened than in the case of the first embodiment. Consequently, when the processing capability of the personal computer 51 is low or when much of the processing capability of the personal computer 51 is desired to be allocated to other features, the configuration such as that described in connection with the first embodiment is advantageous to constructing a system having a large number of printers 2.

Conversely, in the image forming system of the first embodiment, the load imposed on the printer 2 can be lessened. Hence, when the personal computer 51 has sufficiently-high processing capability, it is better to configure the image forming system as described in connection with the first embodiment. In this case, the processing to be imposed on the printer 2 is decreased. Hence, a personal computer whose processing capability is lower than that of the control system of the printer 2 can be adopted. Manufactured costs of the printer 2 can be reduced correspondingly. Therefore, when a system having a large number of printers 2 is constructed, the configuration, such as that described in connection with the first embodiment, is advantageous.

Third Embodiment

An embodiment differing from the first and second embodiments will now be described. A difference between the present embodiment and the first embodiment lies in processing to be executed by the personal computer 51. Since no difference exists between the personal computer 51 and the printer 2 in view of hardware or the like, in the following description a detailed explanation is directed chiefly toward a difference between the first embodiment and the present embodiment, and explanations about the common configuration are omitted.

Figure 12:
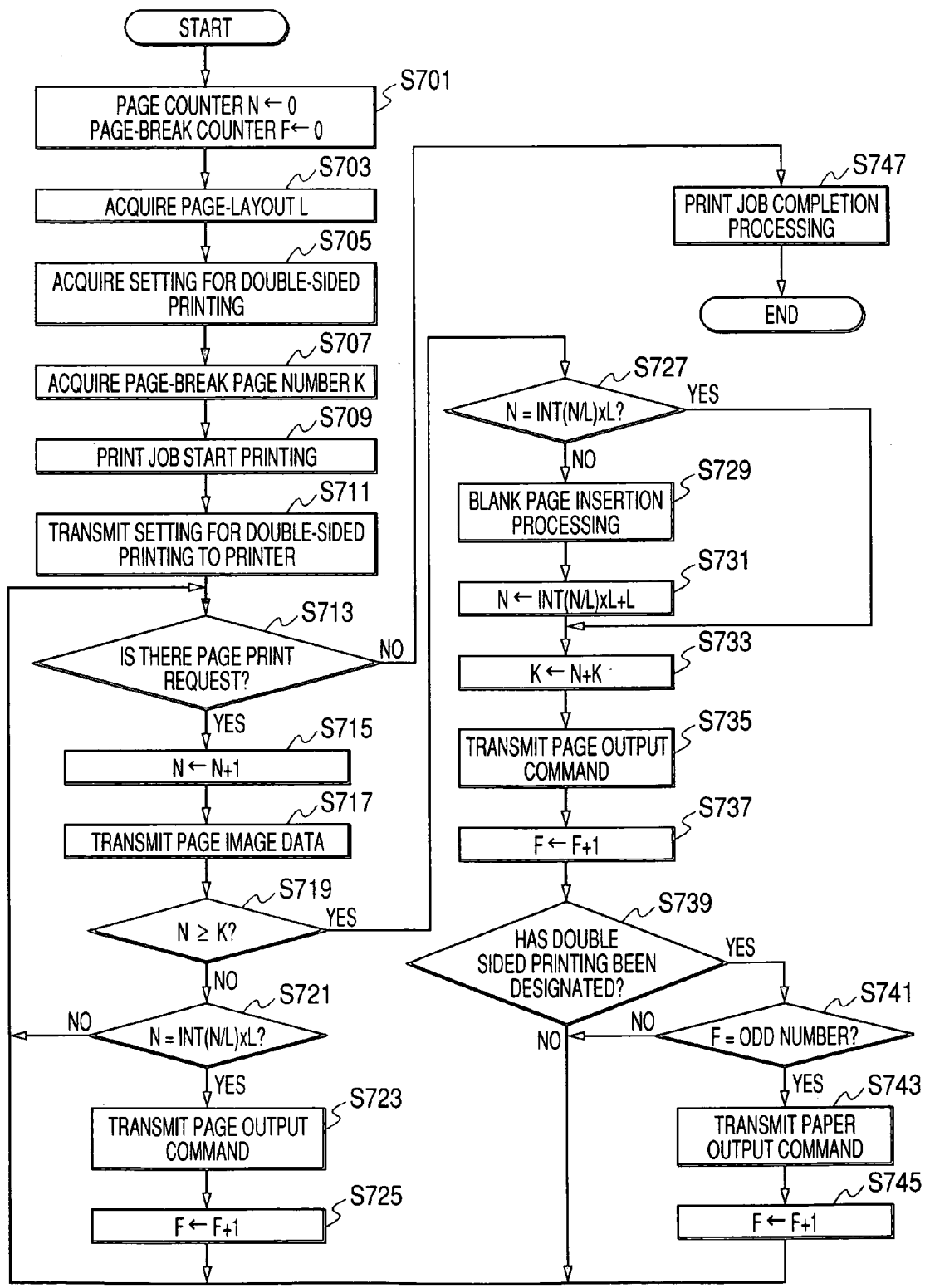
FIG. 12 is a flowchart of printing according to a third embodiment.

The first embodiment has provided illustration of independent flowcharts for page-layout print processing and double-sided printing. The print processing to be described below is complex print processing into which page-layout printing and double-sided printing are incorporated. Print processing to be described in the third embodiment is processing to be performed by the personal computer 51. In this respect, the present embodiment is closer to the first embodiment than to the second embodiment. Printing to be executed by the personal computer 51 will be described hereinbelow by reference to the flowchart shown in FIG. 12.

When the personal computer 51 commences printing operation, the page counter N and a page-break counter F are initialized (S701). This page counter N is a counter used for retaining an accumulated value corresponding to the number of pages processed during the course of processing which will be described later. During processing pertaining to S701, 0 is set as an initial value. The page-break counter F is a counter for managing control for outputting paper during double-sided printing operation. Details on a specified utilization method will be described in connection with processing to be described later.

Subsequently, the page layout L is acquired (S703); settings for double-sided printing are acquired (S705); and the page-break page number K is acquired (S707). The page layout L is a value designated by the user in the per-sheet page count designation field 107 on the input screen 101 shown in FIG. 5. The settings for double-sided printing are designated by the user in the double-sided print designation field 105 on the input screen 101. The page-break page number K is a value designated by the user in the page-break page number designation field 109 on the same input screen 101.

Subsequently, the personal computer 51 executes print job start processing (S709). This processing is processing which is commonly performed by a print system of this type, such as initialization of various internal data or transmission of initialized data to the printer 2.

After completion of processing pertaining to S709, the settings for double-sided printing are transmitted to the printer 2 (S711). When processing pertaining to S711 is performed, the printer 2 performs, in subsequent steps, either double-sided printing or single-sided printing in accordance with the settings transmitted through processing pertaining to S711, by means of the personal computer 51 outputting print data on a per-page basis.

Subsequently, the personal computer 51 checks whether or not a page print request has been issued (S713). Specifically, a page print request is issued every time a rendering command for one page is output from the application 71 shown in FIG. 4 or every time a page break command is output. Therefore, a check is made as to whether or not such a request is issued.

When the page print request exists (YES in S713), one is added to the page counter N (S715), and page image data are transmitted (S717).

Subsequently, the personal computer 51 checks whether or not a relationship N≧K stands between the page counter N and the page-break page number K (S719). The page-break page number K shows a page number to be handled as a page break for one copy. When the relationship N≧K stands (YES in S719), transmission of page image data up to a page (the final page of one copy), which is to be taken as a page break for one copy by means of immediately-before-executed processing pertaining to S717, is considered to have been performed. When a relationship N<K stands (NO in S719), transmission of page image data up to the page (the final page of one copy), which is to be taken as a page break for one copy, is considered to have not yet been performed.

When a relationship N<K stands (NO in S719), the ordinary page-layout printing is continued without awareness of a page break for one copy. Therefore, a check is made as to whether or not the page counter N has assumed a value corresponding to a multiple of the page layout L (S721). Specifically, a value determined by dividing N by L is rounded (by dropping off a fractional portion of the value), and the value is again multiplied by L, to thus produce a product. The product is compared with N. If these values coincide with each other, a dropped fractional portion is not present, and therefore the page counter N can be determined to assume a value corresponding to a multiple of the page layout L. In contrast, when they do not coincide with each other, there is a dropped fractional portion, and therefore the page counter N can be determined to have failed to assume a value corresponding to a multiple of the page layout L.

If the page counter N has not assumed a value corresponding to the multiple of the page layout N (NO in S721), the essential requirement is to output print data pertaining to the next page without making a switch to the next sheet of recording paper. Accordingly, processing returns directly to step S713. If the page counter N has assumed a value corresponding to a multiple of page layout L (YES in S721), data used for forming images of L pages on one surface of the recording paper have already been output at that point in time. Therefore, a paper output command is transmitted in order to making a switch to the next sheet of recording paper (S723), and processing returns to processing pertaining to S713.

When a relationship N≧K is acquired as determined through processing pertaining to S719 (YES in S719), there must be performed control for switching the recording paper to the next sheet of recording paper while maintaining awareness of a page break for one copy. Specifically, a check is first made as to whether or not the page counter N assumes a value corresponding to a multiple of the page layout L (S727). This check method is completely identical with processing pertaining to S721.

Here, if the page counter N has not assumed the value corresponding to the multiple of the page layout L (NO in S727), an area of one page or more which can be subjected to printing must be left on one surface of the recording paper. Blank page insertion processing is performed so as to prevent the top page of the next copy from being recorded in that area (S729). This blank page insertion processing is presumed to be processing for forming a blank image. However, if a state in which a blank page is inserted is achieved in subsequent processing by performing mere control processing for making a switch to the next sheet of recording paper, data representing a blank does not need to be actually transmitted.

The number of the blank page to be inserted by means of processing pertaining to S729 is added to the page counter N (S731). Specifically, a value determined by dividing N by L is rounded to an integer (by dropping off a fractional portion of the value). The value is again multiplied by L, to thus produce a product. L is further added to the product. The resultant value is newly set in the page counter N. This means that the fractional portion of the number which is less than L is dropped; and that L is further added to the resultant value. Hence, the number of blank pages is added to N according to calculation.

In contrast, if the page counter N assumes a value corresponding to a multiple of the page layout L in processing pertaining to S727 (YES in S727), images corresponding to L pages are laid out on one surface of recording paper, and no printable area is left. In this case, switching is made to the next sheet of recording paper without insertion of a blank page when the images have been laid out up to a page which is to be taken as a page break for one copy. Hence, processing pertaining to S729, S731 is skipped.

When processing pertaining to S731 is completed or an affirmative determination is made through processing pertaining to S727, processing successively proceeds to S733. A value determined by adding the page-break page number K to the page counter N is taken as a new page-break page number K (S733). By means of this processing, a page number to be considered to be a page break for the next copy is reset in both when insertion of a blank page has not been performed and when insertion of a blank page has been performed. In order to effect a switch to the next sheet of recording paper, a page output command is transmitted (S735).

Subsequently, one is added to the page-break counter F (S737), thereby checking whether or not double-sided printing is designated (S739). When double-sided printing is designated (YES in S739), a check is made as to whether or not the page-break counter F assumes an odd number (S741). When the page-break counter F assumes an odd number (YES in S741), the paper output command is transmitted (S743). Even when double-sided printing is designated through processing pertaining to S739 to S743 and when printing of data only on one surface has been performed, control for making a switch to the next sheet of recording paper is performed through processing pertaining to S743. When double-sided printing is not designated (NO in S739), processing pertaining to S743 provided for outputting paper with the second surface being left as a blank page becomes unnecessary. When the page-break counter F assumes an even number (NO in S741), printing of data on the second surface has just been completed. Therefore, processing pertaining to S743 provided for outputting paper with the second surface being left as a blank page becomes unnecessary. Hence, processing pertaining to S743 and S745 is skipped. Thus, after completion of processing pertaining to S739 to S745, processing returns to processing pertaining to S713.

Respective surfaces of recording paper are subjected to recording in sequence of first and second surfaces every time images corresponding to L pages are laid out in one surface through repetition of the above-described processing pertaining to S713 to S745, until a page break for one copy comes. A switch to the next sheet of recording paper is made after the second surface has finished being subjected to recording. If images corresponding to L pages have been laid out in one surface when a page break for a copy unit has come, the recording paper is switched. However, the images corresponding to L pages have not been laid out in one surface, a blank page is inserted to that surface. Further, if the images have not been laid in the second surface, a blank page is inserted to the second surface, as well. In addition, a switch to the next sheet of recording paper is made.

If the print job is determined to have been completed through repetition of processing pertaining to S713 to S745 (YES in S713), print completion processing, including initialization of internal data, is performed (S747), and the current processing is terminated.

As has been described above, according to the double-sided printing, a switch to the next sheet of recording paper is performed at a page break of each copy by only the user designating the number of pages L per sheet, the page-break page number K considered to be a page break for a copy unit, and whether or not double-sided printing is to be performed. Therefore, when page-layout printing or double-sided printing is desired to be performed by separating a plurality of copies of print data from each other on a per-copy basis, the copies of print data being identical with each other in terms of the number of pages per copy, there is no necessity for consuming efforts for individually specifying all of the page numbers at which the data are to be separated from each other. Desired printing can be performed readily.

The embodiments of the present invention have been described. However, the present invention is not limited to a specific one embodiment and can be carried out in various forms.

For instance, the first and third embodiments illustrate a case where the most of primary processing is performed by the personal computer 51. The second embodiment illustrates a case where some of primary processing is performed by the personal computer 51 and where some of the remaining processing is performed by the printer 2. The extent to which the personal computer 51 performs processing and the extent to which the printer 2 performs processing are arbitrary, so long as the personal computer and the printer are provided in a data transmission path extending from a section which generates print data to serve as a basis (e.g., the application 71) to a section which finally forms an image (e.g., the image forming section 42), in such a sequence that processing of a preceding stage, which is required by processing of a subsequent stage, is completed before the processing of subsequent stage.

For instance, the number of pages L per sheet, the page-break page number K to be considered to be a page break for a copy unit, and printing conditions as to whether or not double-sided printing is to be performed are all input by way of the personal computer 51. However, it may also be possible to allow input of the printing conditions by way of a control panel provided on the printer 2. Even in this case, the essential requirement is to configure the personal computer 51 so as to transmit only print data to the printer 2.

In addition, a program for attaining the functions in the embodiments may be recorded in a computer-readable recording medium. In this case, the program recorded in the recording medium is read and executed by a computer system. Incidentally, the "computer system" mentioned here includes an operation system or hardware such as peripheral equipment.

In addition, the "computer system" includes a homepage providing environment (or display environment) when it uses a WWW system.

On the other hand, the "computer-readable recording medium" means a portable medium such as a flexible disk, a magneto-optical disk, a ROM or a CD-ROM, or a storage unit such as a hard disk included in the computer system. Further the "computer-readable recording medium" includes a medium for holding the program for a predetermined time, such as a volatile memory (RAM) in a computer system as a server or a client when the program is transmitted through a network such as the Internet or a communication circuit such as a telephone circuit.

In addition, the program may be transmitted from a computer system storing the program in a storage unit or the like to another computer system through a transmission medium or by a transmitted wave in the transmission medium. Here, the "transmission medium" for transmitting the program means a medium having a function of transmitting information, including a network (communication circuit) such as the Internet or a communication circuit (communication line) such as a phone line.

In addition, the program may be prepared for attaining a part of the aforementioned functions. Further, the program may be a so-called difference file (difference program) which can attain the aforementioned functions in combination with a program which has been already recorded in the computer system.

Further, these modifications may be used selectively and suitably in combination.

What is claimed is:

1. An image forming system comprising:
a print data generation section that generates print data;
an image forming section that forms an image on a medium; and
a control device that controls the image forming section so as to effect page-layout printing that includes scaling-down of images corresponding to L pages (where L is an integer satisfying a relationship L≧2) on the basis of the print data generated by the print data generation section and printing conditions designated by a user, and laying-out of the scaled-down images within one surface of the medium, the control device comprising:
a print data input unit for inputting the print data by way of the print data generation section;
a layout page number acquisition unit that acquires the number of pages L designated by the user as one of the printing conditions;
a page-break page number acquisition unit that acquires, as one of the printing conditions, a page number K (K is an integer satisfying a relationship K≧1) which is to be considered to be a page break for one copy designated by the user;
a determination unit which takes, as copy unit data, page numbers determined by separating the print data input by the print data input unit from a top page side of the print data by every K pages; takes, as surface unit data, page numbers determined by separating the copy unit data from a top page side of the copy unit data by every number of images to be formed on one surface of the medium; takes, as determination object data, the surface unit data including a final page of the copy unit data; and determines whether or not the number of pages "p" included in the determination object data coincides with the number of pages L; and a round processing control unit that controls the image forming section such that blank pages compensating for images corresponding to (L-p) pages are formed in addition to the images corresponding to "p" pages formed on the basis of the determination object data when the determination unit determines that there exists a relationship (p<L).

2. The image forming system according to claim 1, wherein the print data generation section and the control device are included in a host device.

3. An image forming system comprising:

a print data generation section that generates print data;

an image forming section that forms an image on a medium; and a control device that controls the image forming section so as to effect page-layout printing that includes scaling-down of images corresponding to L pages (where L is an integer satisfying a relationship $L \geq 2$) on the basis of the print data generated by the print data generation section and printing conditions designated by a user, and laying-out of the scaled-down images within one surface of the medium, the control device comprising:

a print data input unit for inputting the print data by way of the print data generation section;

a layout page number acquisition unit that acquires the number of pages L designated by the user as one of the printing conditions;

a page-break page number acquisition unit that acquires, as one of the printing conditions, a page number K (K is an integer satisfying a relationship $K \geq 1$) which is to be considered to be a page break for one copy designated by the user;

a transmission unit that transmits the print data input by the print data input unit, the number of pages L acquired by the layout page number acquisition unit, and the page number K acquired by the page-break page number acquisition unit;

a receiving unit that receives the print data, the number of pages L, and the page number K transmitted from the transmission unit;

a determination unit which takes, as copy unit data, page numbers determined by separating the print data received by the receiving unit from a top page side of the print data by every K pages; takes, as surface unit data, page numbers determined by separating the copy unit data from a top page side of the copy unit data by every number of images to be formed on one surface of the medium; takes, as determination object data, the surface unit data including a final page of the copy unit data; and determines whether or not the number of pages "p" included in the determination object data coincides with the number of pages L; and a round processing control unit that controls the image forming section such that blank pages compensating for images corresponding to (L-p) pages are formed in addition to the images corresponding to "p" pages formed on the basis of the determination object data when the determination unit determines that there exists a relationship (p<L);

wherein the print data generation section, the print data input unit, the layout page number acquisition unit, the page-break page number acquisition unit and the transmission unit are included in a host device; and the image forming section, the receiving unit, the determination unit and the round processing control unit are included in an image forming device.

4. An image forming system comprising:

a print data generation section that generates print data;

an image forming section that forms an image on a medium; and a control device that controls the image forming section so as to effect double-sided printing, which uses first and second surfaces of the medium, on the basis of the print data generated by the print data generation section and printing conditions designated by a user, the control device comprising:

a print data input unit for inputting the print data by way of the print data generation section;

a page-break page number acquisition unit that acquires, as one of the printing conditions, a page number K (K is an integer satisfying a relationship $K \geq 1$) which is to be considered to be a page break for one copy designated by the user;

a determination unit which takes, as copy unit data, page numbers determined by separating the print data input by the print data input unit from a top page side of the print data by every K pages; takes, as medium unit data, page numbers determined by separating the copy unit data from a top page side of the copy unit data by every number of images to be formed on two surfaces of the medium; takes, as determination object data, the medium unit data including a final page of the copy unit data; and determines whether an image of the final page included in the determination object data is formed on the first or second surface; and a round processing control unit that controls the image forming section such that a blank page compensating for an image to be formed on the second surface is formed in addition to the image to be formed on the first surface formed on the basis of the determination object data, when the determination unit determines that the image of the final page included in the determination object data is formed on the first surface.

5. The image forming system according to claim 4, wherein the print data generation section and the control device are included in a host device.

6. An image forming system comprising:

a print data generation section that generates print data;

an image forming section that forms an image on a medium; and a control device that controls the image forming section so as to effect double-sided printing, which uses first and second surfaces of the medium, on the basis of the print data generated by the print data generation section and printing conditions designated by a user, the control device comprising:

a print data input unit for inputting the print data by way of the print data generation section;

a page-break page number acquisition unit that acquires, as one of the printing conditions, a page number K (K is an integer satisfying a relationship $K \geq 1$) which is to be considered to be a page break for one copy designated by the user;

a transmission unit that transmits the print data input by the print data input unit and the page number K acquired by the page-break page number acquisition unit;

a receiving unit that receives the print data and the page number K transmitted from the transmission unit;

a determination unit which takes, as copy unit data, page numbers determined by separating the print data received by the receiving unit from a top page side of the print data by every K pages; takes, as medium unit data, page numbers determined by separating the copy unit data from a top page side of the copy unit data by every number of images to be formed on two surfaces of the medium; takes, as determination object data, the medium unit data including a final page of the copy unit data; and determines whether an image of the final page included in the determination object data is formed on the first or second surface; and a round processing control unit that controls the image forming section such that a blank page compensating for an image to be formed on the second surface is formed in addition to the image to be formed on the first surface formed on the basis of the determination object data, when the determination unit determines that the image of the final page included in the determination object data is formed on the first surface;

wherein the print data generation section, the print data input unit, the page-break page number acquisition unit and the transmission unit are included in a host device; and the image forming section, the receiving unit, the determination unit and the round processing control unit are included in an image forming device.

7. A computer readable medium bearing software instructions for causing a host device having a print data generation section that generates print data and an image forming device having an image forming section that forms an image on a medium to perform page-layout printing that includes scaling-down of images corresponding to L pages (where L is an integer satisfying a relationship $L \geq 2$) on the basis of the print data generated by the print data generation section and printing conditions designated by a user, and laying-out of the scaled-down images within one surface of the medium, the software instructions comprising:

inputting the print data by way of the print data generation section;

acquiring the number of pages L designated by the user as one of the printing conditions;

acquiring, as one of the printing conditions, a page number K (K is an integer satisfying a relationship $K \geq 1$) which is to be considered to be a page break for one copy designated by the user;

taking, as copy unit data, page numbers determined by separating the print data from a top page side thereof by every K pages;

taking, as surface unit data, page numbers determined by separating the copy unit data from a top page side thereof by every number of images to be formed on one surface of the medium;

taking, as determination object data, the surface unit data including a final page of the copy unit data;

determining whether or not the number of pages "p" included in the determination object data coincides with the number of pages L; and controlling the image forming section such that blank pages compensating for images corresponding to (L-p) pages are formed in addition to the images corresponding to "p" pages formed on the basis of the determination object data when it is determined that there exists a relationship (p<L).

8. A computer readable medium bearing software instructions for causing a host device having a print data generation section that generates print data and an image forming device having an image forming section that forms an image on a medium to perform double-sided printing, which uses first and second surfaces of the medium, on the basis of the print data generated by the print data generation section and printing conditions designated by a user, the software instructions comprising:

inputting the print data by way of the print data generation section;

acquiring, as one of the printing conditions, a page number K (K is an integer satisfying a relationship $K \geq 1$) which is to be considered to be a page break for one copy designated by the user;

taking, as copy unit data, page numbers determined by separating the print data from a top page side thereof by every K pages;

taking, as medium unit data, page numbers determined by separating the copy unit data from a top page side thereof by every number of images to be formed on two surfaces of the medium;

taking, as determination object data, the medium unit data including a final page of the copy unit data;

determining whether an image of the final page included in the determination object data is formed on the first or second surface; and controlling the image forming section such that a blank page compensating for an image to be formed on the second surface is formed in addition to the image to be formed on the first surface formed on the basis of the determination object data, when it is determined that the image of the final page included in the determination object data is formed on the first surface.

\* \* \* \* \*